(12) United States Patent
Davis

(10) Patent No.: US 11,207,713 B2
(45) Date of Patent: Dec. 28, 2021

(54) DISC FOR USE IN DISC SCREEN

(71) Applicant: Nicholas Davis, San Diego, CA (US)

(72) Inventor: Nicholas Davis, San Diego, CA (US)

(73) Assignee: CP MANUFACTURING, INC., San Diego, CA (US)

( * ) Notice: Subject to any disclaimer, the term of this patent is extended or adjusted under 35 U.S.C. 154(b) by 263 days.

(21) Appl. No.: 16/546,136

(22) Filed: Aug. 20, 2019

(65) Prior Publication Data

US 2020/0101493 A1 Apr. 2, 2020

Related U.S. Application Data

(63) Continuation of application No. 16/193,815, filed on Nov. 16, 2018, now Pat. No. 10,406,560.

(60) Provisional application No. 62/739,692, filed on Oct. 1, 2018, provisional application No. 62/883,611, filed on Aug. 6, 2019.

(51) Int. Cl.
| | |
|---|---|
| *B07B 1/15* | (2006.01) |
| *B07B 1/14* | (2006.01) |
| *A01D 17/06* | (2006.01) |
| *D21B 1/02* | (2006.01) |

(52) U.S. Cl.
CPC .............. *B07B 1/15* (2013.01); *A01D 17/06* (2013.01); *B07B 1/145* (2013.01); *D21B 1/02* (2013.01)

(58) Field of Classification Search
CPC .. B07B 1/14; B07B 1/145; B07B 1/15; B07B 1/16; Y10T 29/49554; A01D 17/06; D21B 1/02

USPC .......... 209/271, 667, 669, 671, 672
See application file for complete search history.

(56) References Cited

U.S. PATENT DOCUMENTS

| | | | | |
|---|---|---|---|---|
| 1,148,165 | A * | 7/1915 | Hardie | B07B 1/14 209/668 |
| 1,766,340 | A * | 6/1930 | Kendall | B07B 1/15 209/627 |
| 2,743,813 | A | 5/1956 | Erickson | |
| 3,028,957 | A * | 4/1962 | Conway | B07B 1/15 209/672 |
| 3,747,149 | A * | 7/1973 | Tatyanko | A01D 17/06 15/3.11 |
| 4,430,210 | A * | 2/1984 | Tuuha | B07B 1/15 209/234 |
| 4,872,247 | A * | 10/1989 | Nakamura | B65H 27/00 492/40 |
| 4,953,712 | A * | 9/1990 | Meester | B07B 1/15 198/663 |
| 7,581,648 | B2 * | 9/2009 | Greenbank | B07B 1/15 209/621 |
| 8,939,292 | B2 * | 1/2015 | Doppstadt | B07B 1/14 209/254 |

(Continued)

OTHER PUBLICATIONS

International Search Report for PCT/US19/40422 dated Nov. 13, 2019.

*Primary Examiner* — Joseph C Rodriguez
(74) *Attorney, Agent, or Firm* — Manuel de la Cerra

(57) ABSTRACT

A disc for use in a disc screen is disclosed. The disc includes a longitudinal disc axis and a hub extending a length along the longitudinal disc axis. The hub further includes a hub surface and a helical ridge structure extending away from the hub surface and twisting about the longitudinal axis at least 360 degrees. A cross-section of the hub taken perpendicularly to the longitudinal disc axis is non-circular.

15 Claims, 33 Drawing Sheets

(56) References Cited

U.S. PATENT DOCUMENTS

| | | | |
|---|---|---|---|
| 8,991,616 B2* | 3/2015 | Parr | B07B 1/4636 |
| | | | 209/672 |
| 9,238,254 B1* | 1/2016 | Davis | B07B 1/15 |
| RE46,010 E * | 5/2016 | Kaiser | C03B 35/185 |
| 9,849,484 B2* | 12/2017 | Guenther | B07B 1/145 |
| 10,406,560 B1* | 9/2019 | Davis | B07B 1/145 |
| 2007/0227953 A1 | 10/2007 | Paron | |
| 2011/0259799 A1* | 10/2011 | Paron | B07B 1/15 |
| | | | 209/363 |
| 2015/0336133 A1* | 11/2015 | Wess | B07B 1/155 |
| | | | 209/669 |
| 2016/0129476 A1 | 5/2016 | Gunther | |
| 2020/0338595 A1* | 10/2020 | Davis | B07B 1/15 |

* cited by examiner

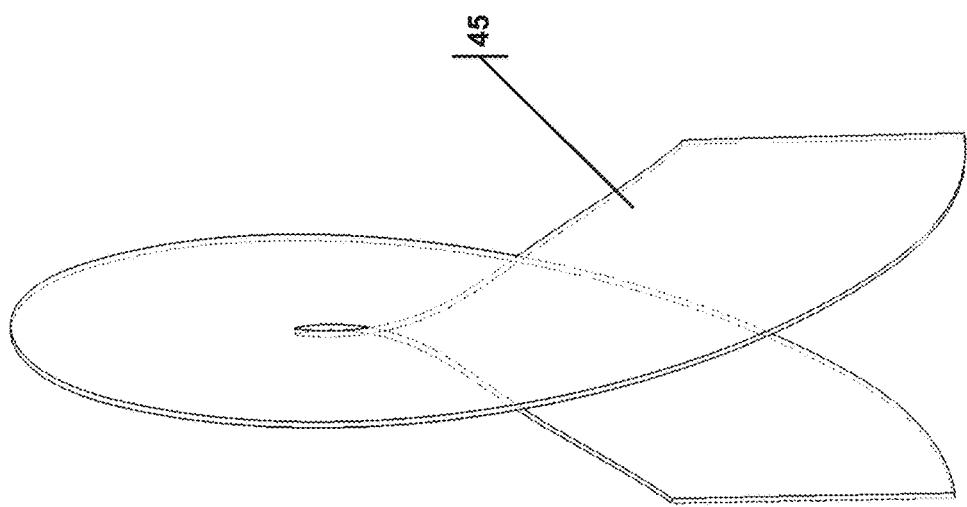

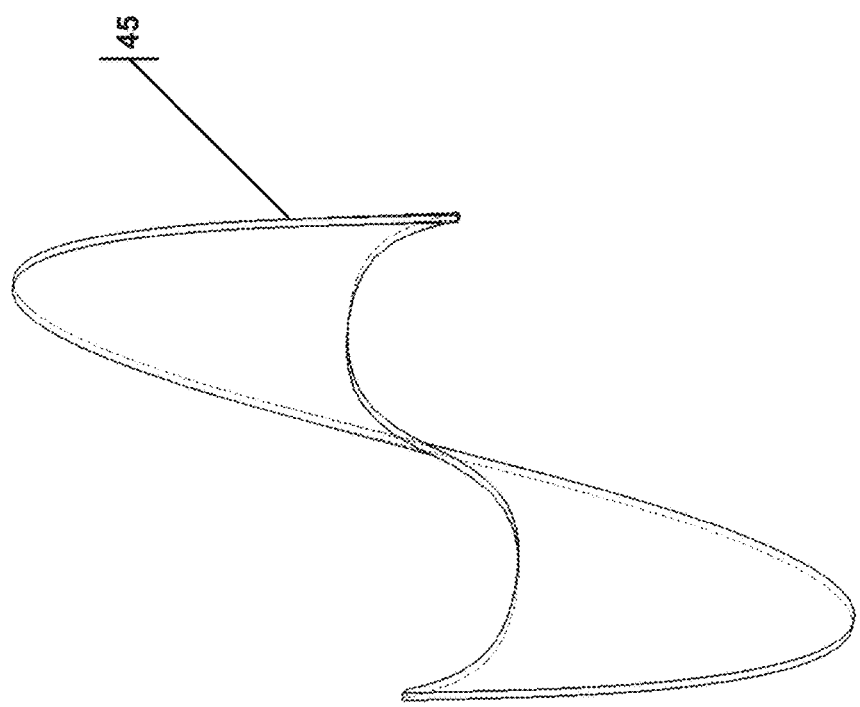

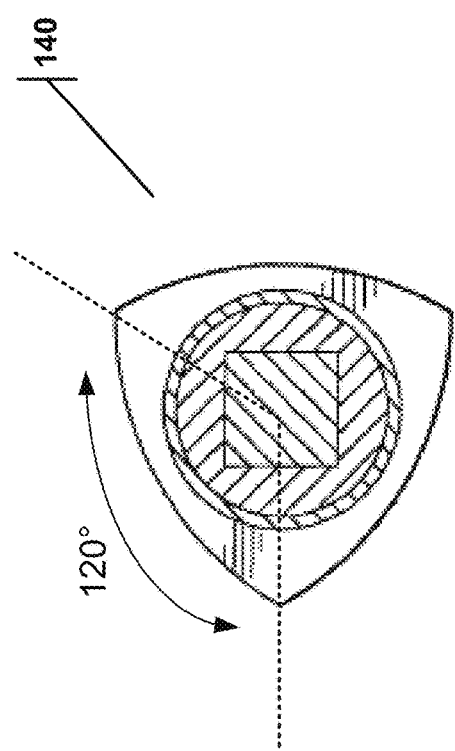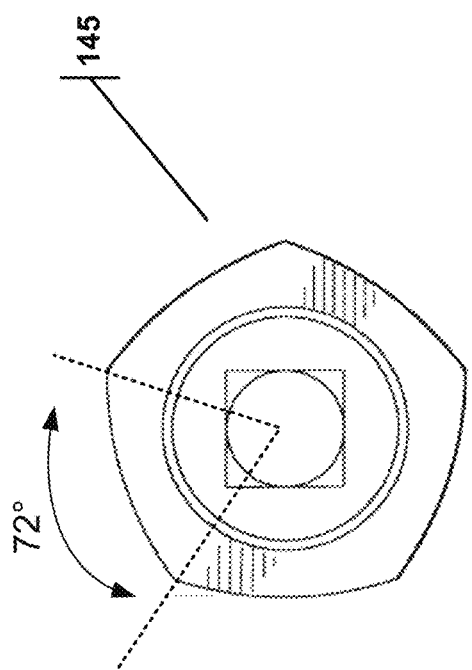
FIG. 16A
FIG. 16B

DISC FOR USE IN DISC SCREEN

RELATED APPLICATIONS

This application claims priority to U.S. Patent Application 62/739,692, filed on Oct. 1, 2018, U.S. Patent Application 62/883,611, filed on Aug. 6, 2019, and U.S. patent application Ser. No. 16/193,815, filed on Nov. 16, 2018; the contents of each of these applications are incorporated herein by reference.

TECHNICAL FIELD

The present invention relates generally to machines used to sort materials and mixed recyclable materials.

BACKGROUND

A bulk material screening device is a device that separates input material by size or shape. These screening devices are used in industries such as mining and aggregates, forestry, agriculture, and recycling to separate inbound materials into more valuable products. For example, in the solid waste and recycling industry, high value corrugated cardboard containers tend to be of a larger size than other recyclable materials, and so can be separated from other materials based on their large size. Traditional screening devices include trommels, disc screens, and vibratory screens.

Trommel screens and vibratory screens utilize a static screening surface, consisting of a steel or polymer material with holes of a certain size, and bring material into contact with the screening surface such that materials smaller than the holes pass through the screening surface, and materials larger than the holes do not. These types of static screens are subject to operational and maintenance hazards when materials build up in or around the holes of the screening surface. This typically happens due to wet or stringy material. As material builds up around the holes, the hole size becomes smaller, and the nature of the screened material changes. Once the holes become too small, it becomes necessary to stop the machine so that the screening surface can be cleaned.

A disc screen consists of a series or parallel rotors or shafts, with attached discs or stars, turned in concert such that a sufficiently consistent opening between the rotors is achieved as they are turned. Screening is achieved by constructing the rotors and discs such that the desired opening is achieved. The rotation of the rotors also drives the material forward, making it easier to bring new material into contact with the screening surface, allowing for smaller and cheaper machines to be used to accomplish the same task as passive screens. This type of active screening surface is not subject to the buildup of wet materials as described above. However, the rotors are extremely prone to wrapping on stringy materials. As each rotor is increasingly wrapped, the opening of the screening surface decreases due to wrapped material. Once the openings become too small, it is necessary to clean the machine by cutting the wrappings off with a chisel or knife. The prevalence of plastic bags and other stringy material within solid waste is a consistent challenge for the waste and recycling industry when using disc screens.

It is generally understood that many of the maintenance hazards for disc screens cease to be an issue as the opening of the screen becomes small enough that stringy material can no longer fit through the opening. This typically occurs at an opening size of approximately two inches. However, a screen with this size opening typically cannot accept any material larger than six inches, or it risks having the openings covered, or blinded, by the larger material, meaning that disc screens that don't suffer maintenance issues typically are located toward the end of a material processing line, after larger items have been removed.

When the aforementioned machines are used in particularly difficult material streams that present high levels of maintenance hazards, there is often a conveyor belt configured to allow for human sorting of materials placed before any machine to remove such hazards. This is typically called a "pre-sort". Pre-sorting material before the mechanical process is expensive, as it takes many human sorters to sift through the full burden depth of the material. Furthermore, this pre-sort station is the most hazardous sort station for the human sorters, as they receive all of the heterogeneous material. They are tasked with sorting large, heavy objects from a moving pile, which can be up to 30" away from them, while avoiding getting stabbed by broken glass, sharp metal objects, and other sharp objects such as used hypodermic needles that would typically be found in a small fraction of material. For this reason, most workers at a pre-sort station utilize Kevlar or similar gloves to protect themselves, but this makes it even more difficult to lift the intended items, requiring additional sorters and additional expense to achieve a sufficient pre-sort such that the material screening devices do not constantly break down.

Another type of active material screening device consists of a series of parallel augers with interleaved flights with consistent spacing such that the opening between auger shafts and flights creates a screening surface. An auger is a central shaft with a rotating helical blade attached to the radial surface. As a helix is necessarily a projection on the surface of a cylinder with a constant angle between the tangent of the projection and a central axis, augers are traditionally round. In the application of a screening device made out of augers, the roundness of the auger and consistent spacing of flights guarantee that the adjacent augers do not collide. Auger screens are beneficial in certain industries, such as the screening of solid waste materials, where wrapping and plugging of traditional screening devices is a problem. This is because as material wraps on the auger shaft, the flights of the adjacent augers push the wrapped material off the shaft and prevent plugging and jamming. However, as augers are constrained to a circular shape, the current state of the art in auger screens does not provide any bouncing motion or material agitation, so material does not sift toward the screening surface, which limits applications to when material can be singulated, or reduces screening efficiency compared to disc screens, requiring much larger machines to be used to accomplish the same task. Furthermore, as taught by Gunther in EP 1570 919 B1, this machine is very sensitive to the material feed configuration, requiring the machine to be fed laterally with a high speed belt such that material is flung onto the machine, rather than dropped, to minimize the sorting inefficiencies from having no agitation.

It is not necessary to pre-sort an auger screen, as it is with other screening devices, allowing it to be placed in front of the pre-sort. In the current state of the art, an auger screen with approximately an 8" opening is placed before the pre-sort to screen out small and potentially hazardous items. The pre-sorters can then focus on the sorting of large items that are maintenance hazards without needing to worry about getting stabbed by broken glass or hypodermic needles. This further allows fewer pre-sorters to be used to accomplish the same task compared to a traditional pre-sort.

However, the auger screen is not suitable for the final screening of materials, such as a typical disc screen configured for the separation of old corrugated cardboard from mixed recyclables. These machines have an approximately 12"×12" opening with rotors on 20" centers and an amplitude of agitation of 2" to 5". The high amplitude is necessary as OCC, such as the box of a flat screen television, is large and flat compared to the other items being sorted, and so other items tend to ride on top of the pieces of OCC. Furthermore, a traditional disc screen typically requires an amplitude of at least 5% of the maximum particle size in order to achieve sufficient sifting action, with higher ratios being better. As such, an OCC Disc Screen with a 2" amplitude would typically be used on items up to 40" in diameter in any one dimension. With no agitation, the auger screen cannot be used for the screening of cardboard, as too many riders pass over the screen.

Wess teaches another form of auger screen in U.S. Pat. No. 9,895,719. The auger flights in this machine consist of a series of "fingers" or "stars" protruding from a substrate. While in theory this will increase the surface speed of materials on the screen deck, the distal end of the fingers describes a circle, and there is too little space between the fingers to provide agitation, so it doesn't solve the primary weakness of existing auger screens. Furthermore, this shape creates a pinching hazard, as the minimum distance between the helical shaped "flight" and the opposite substrate varies continuously and sharply. This creates an impinging motion between the two mechanical parts that has a risk of causing a hard jam in the machine if a hard object, such as a rock, falls behind a finger and is forced into the opposing substrate by the following finger. While this risk is relatively small for small-opening screening devices and with the fingers placed tightly together, as the opening size is increased or the fingers are moved further apart, larger and larger items can fall into the pocket created when the minimum distance is at a maximum, which can then be pinched by the following finger, creating a hard jam. As such, this limits the inventions to the screening of small items, which can already be screened utilizing disc screens that have inherent agitation.

What is therefore needed is an auger-type disc for use in a disc screen that overcomes these deficiencies.

SUMMARY

The following presents a simplified summary in order to provide a basic understanding of some aspects of the claimed subject matter. This summary is not an extensive overview and is not intended to identify key/critical elements or to delineate the scope of the claimed subject matter. Its purpose is to present some concepts in a simplified form, as a prelude to the more detailed description that are presented later.

The apparatus, systems, and methods described herein elegantly solve the problems presented above. A disc for use in a disc screen is disclosed. The disc includes a longitudinal disc axis and a hub extending a length along the longitudinal disc axis. The hub further includes a hub surface and a helical ridge structure extending away from the hub surface and twisting about the longitudinal axis at least 360 degrees. A cross-section of the hub taken perpendicularly to the longitudinal disc axis is non-circular.

The hub may have multiple lobes. The helical ridge may extend away from hub surface at a height that is constant for the length of the helical ridge.

A disc screen is also disclosed comprised of a first and second adjacent discs. Each disc may be constructed as summarized above, and the helical ridge structure from the first disc may be interleaved with the helical ridge structure of the second disc.

The helical ridge of the first disc may form a gap with the hub surface of the second disc, and when the two discs are rotated in the same direction, the width of the gap may remain substantially constant. The position of the gap may move along the direction of the longitudinal axis of the first disc, and the position of the gap relative to the center of the hub of the first disc is may not be substantially constant. The helical ridge of each disc may extend away from their respective hub surfaces at a height that is constant for the length of the helical ridge.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

FIG. 10A is an end view of the pattern for the helical ridge

FIG. 10B is bottom view of the pattern for the helical ridge.

FIG. 16A illustrates a three-lob hub that may be used with a helical ridge.

FIG. 16B illustrates a five-lob hub that may be used with a helical ridge.

DETAILED DESCRIPTION OF EXAMPLE EMBODIMENTS

Figure 1A:
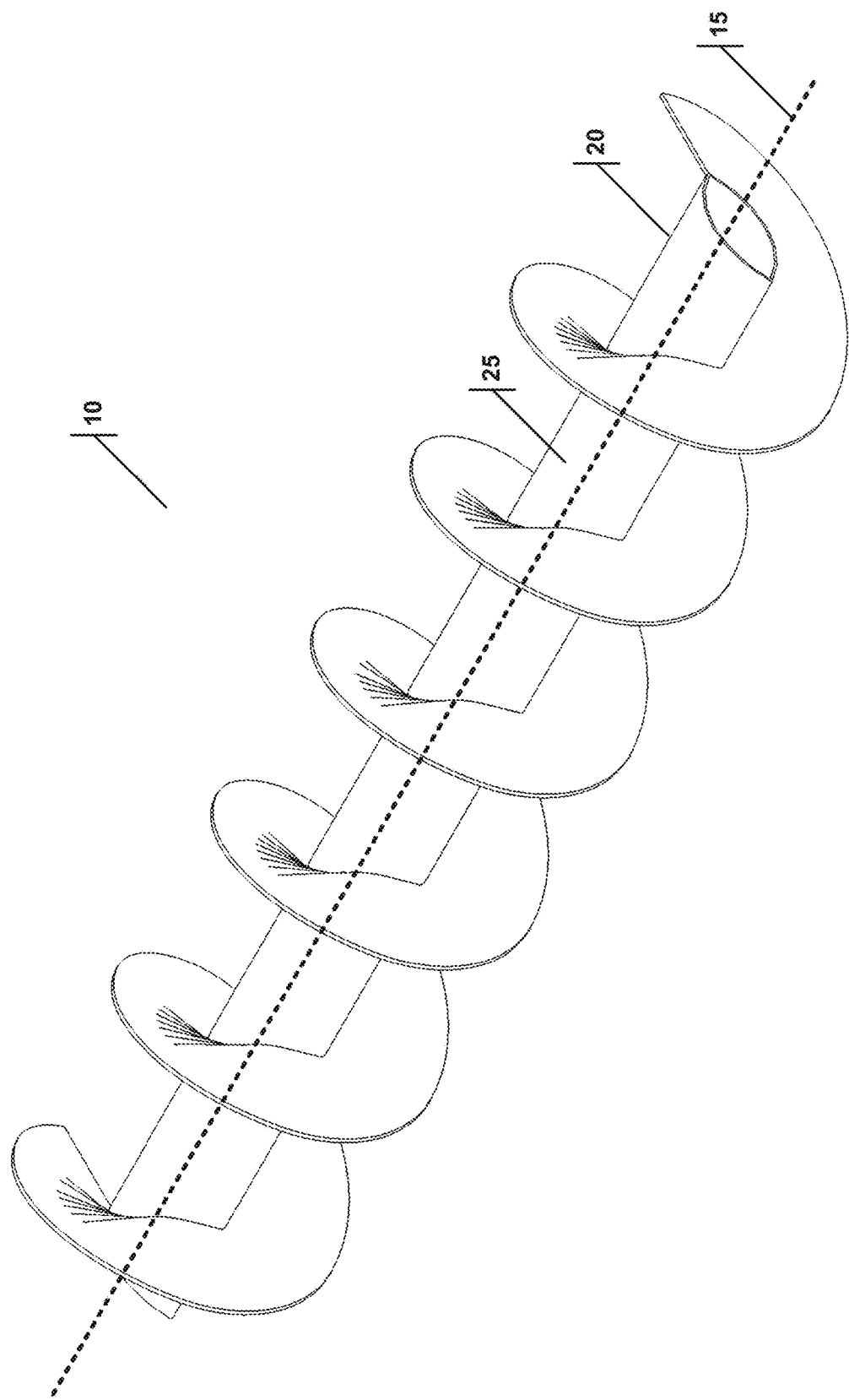
FIG. 1A is an isometric view of a single disc.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with FIGS. 1A-17B and is provided for ease of reference, where like reference numerals designate corresponding features throughout the specification and figures:

| | |
|---|---|
| Disc | 10 |
| Circular Hub Disc with Axis Offset | 10A |
| Non-Circular Hub Disc with Axis Offset | 10B |
| Longitudinal Axis | 15 |
| Hub (non-circular) | 20 |
| Hub (circular) | 21 |
| Auger Disc Rotation Axis/Power Shaft Axis of Rotation | 22 |
| Axis Offset | 23 |
| Hub Lobes | 24 |
| Hub Surface | 25 |
| Major Axis | 30 |
| Minor Axis | 35 |
| Right Angle | 40 |
| Helical Ridge 360 Degree Twist | 42 |
| Helical Ridge | 45 |
| Surface to Ridge Height | 46 |
| Disc Screen | 47 |
| First Adjacent Disc | 50 |
| Second Adjacent Disc | 55 |
| Amplitude Difference | 57 |
| Helical Ridge of First Disc | 60 |
| Helical Ridge of Second Disc | 65 |
| Interleaved Position | 70 |
| Relative Phased Between Discs | 75 |
| Gap | 80 |
| Gap Longitudinal Movement | 82 |
| Gap Lateral Movement | 84 |
| Rotational Direction | 85 |
| Motor | 90 |
| Power Shaft | 95 |
| Gear | 100 |
| Chain/Belt | 105 |
| First Set of Discs Sharing Phase with Each Other | 110 |
| Second Set of Disc Sharing Phase with Each Other | 115 |
| Material Fallout | 120 |
| Shaft Retention Plate | 125 |
| Disc Half | 130 |
| Inner Hub Keyed Surface/Hole | 135 |
| Three-Lobed Hub | 140 |
| Five-Lobed Hub | 145 |
| Peak | 150 |
| Peak Radius | 155 |
| Non-Peak radius | 160 |

Referring to FIGS. 1A-3A, an auger-type disc 10 for use in a disc screen is shown. The disc 10 has a longitudinal axis 15 and includes a hub 20 extending a length along the longitudinal axis 15. The longitudinal axis 15 is coaxial with the center of the hub 20. The hub 20 includes a hub surface 25. Specifically with reference to FIG. 3A, which is a cross sectional view taken perpendicular to the longitudinal axis 15, the disc 10 is shown to more clearly illustrate the two-lobe, non-circular hub 20 that has a major axis 30 and a minor axis 35. The major axis 30 defined by a first cross-section taken perpendicularly to the longitudinal axis 15 and through the center of the hub. The minor axis 35 defined by a second cross-section taken perpendicularly to the longitudinal axis 15 and through the center of the hub.

Figure 1B:
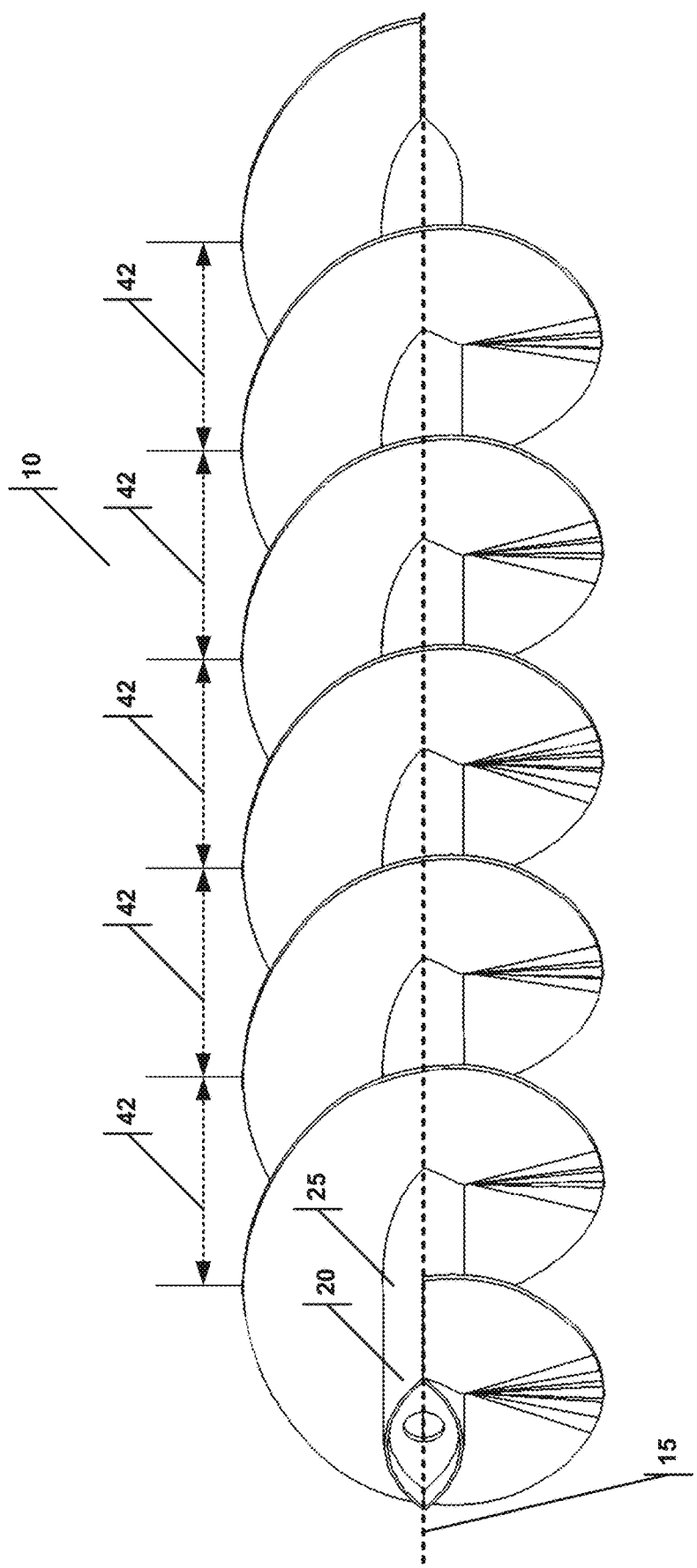
FIG. 1B is an elevated view of a disc.
Figure 1C:
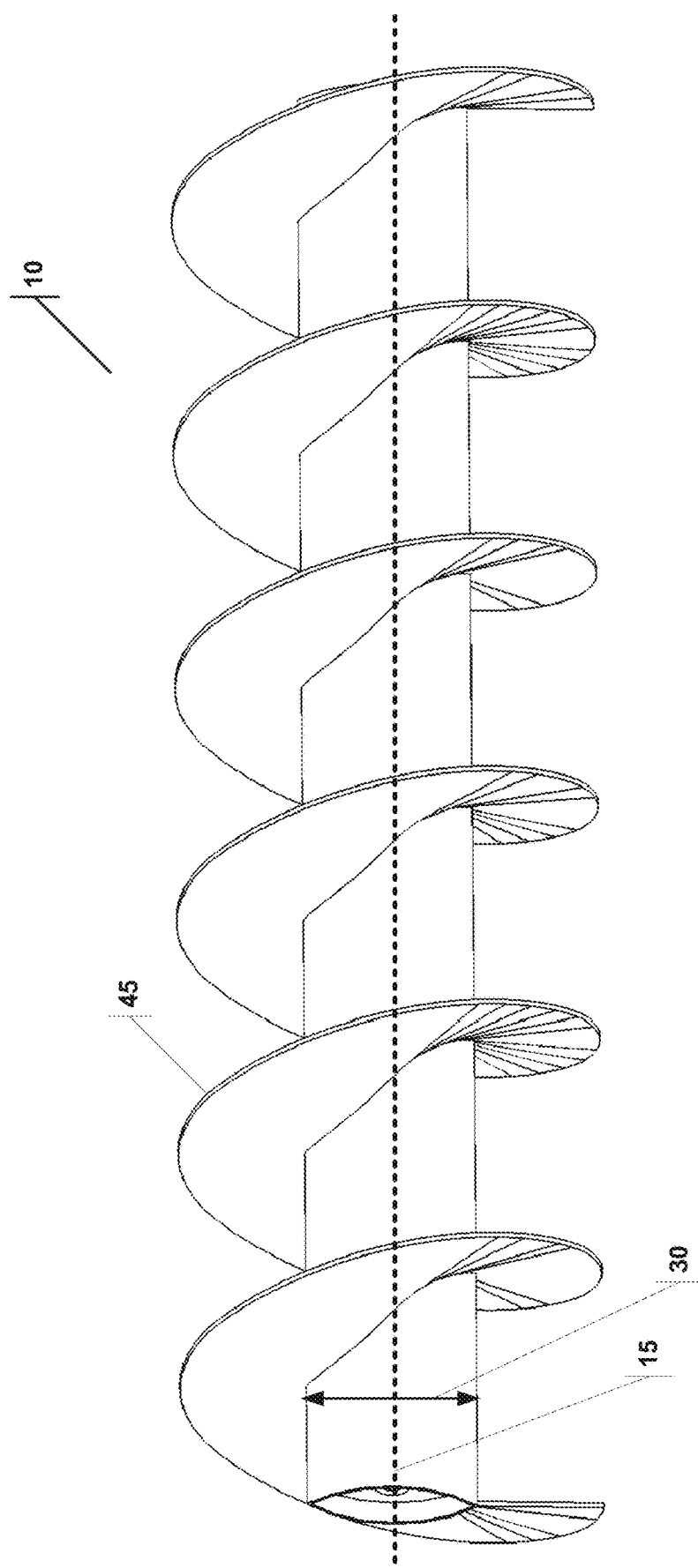
FIG. 1C is an elevated view of a disc phased 90-degrees from FIG. 1B.

The first cross-section of the major axis 30 is longer than the second cross-section of the minor axis 35, and the first cross-section is substantially orthogonal to the second cross-section (shown by right angle 40). A helical ridge structure 45 extends away from the hub surface 25 forming an outer edge that twists at least 360 degrees about the longitudinal axis for the length and maintains a height away from the hub surface throughout the at least 360 degree twist. The twisting of the helical ridge 45 is shown in FIG. 1B, where the helical ridge is shown as twisting five 360-degrees twists (each labeled as 42).

Figure 2A:
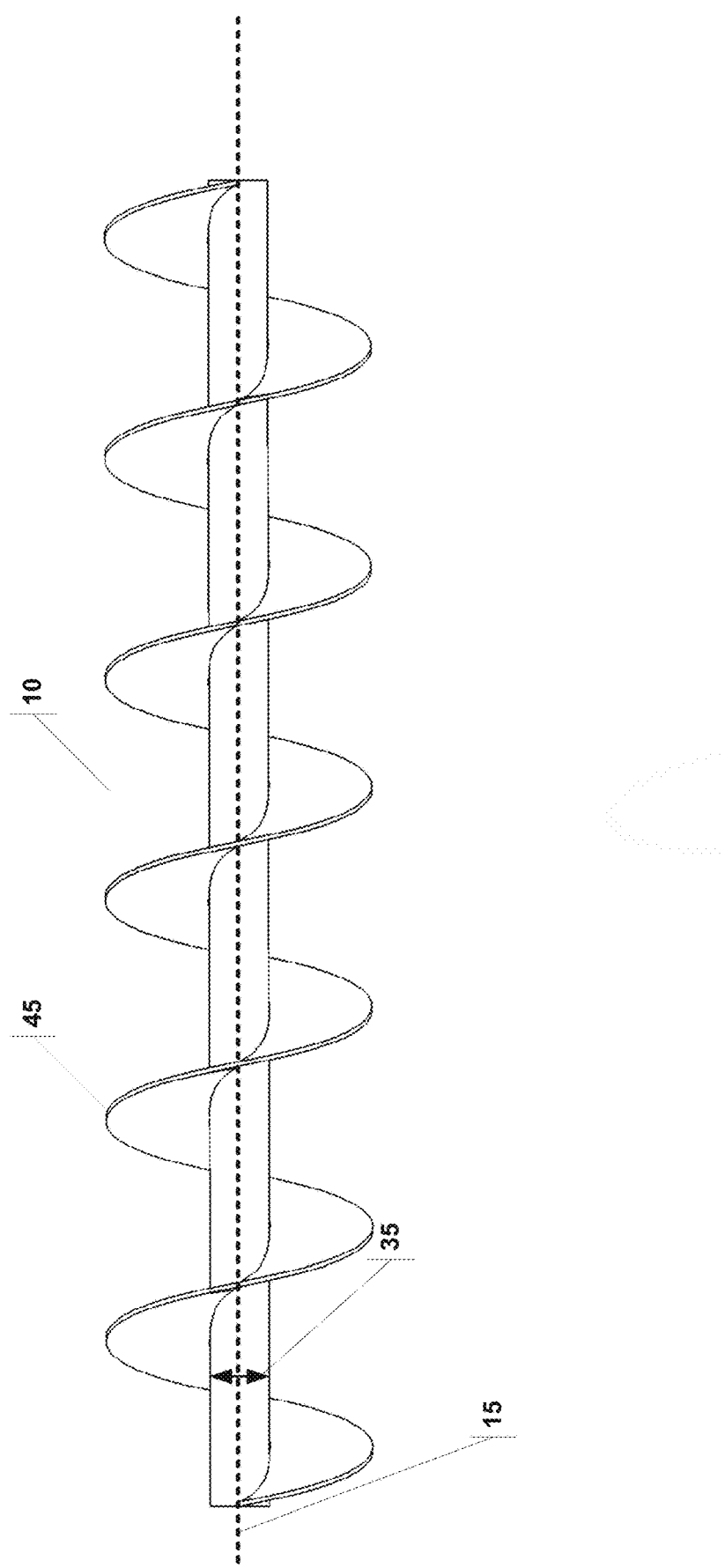
FIG. 2A is a top view of a disc with the minor axis facing up.
Figure 2B:
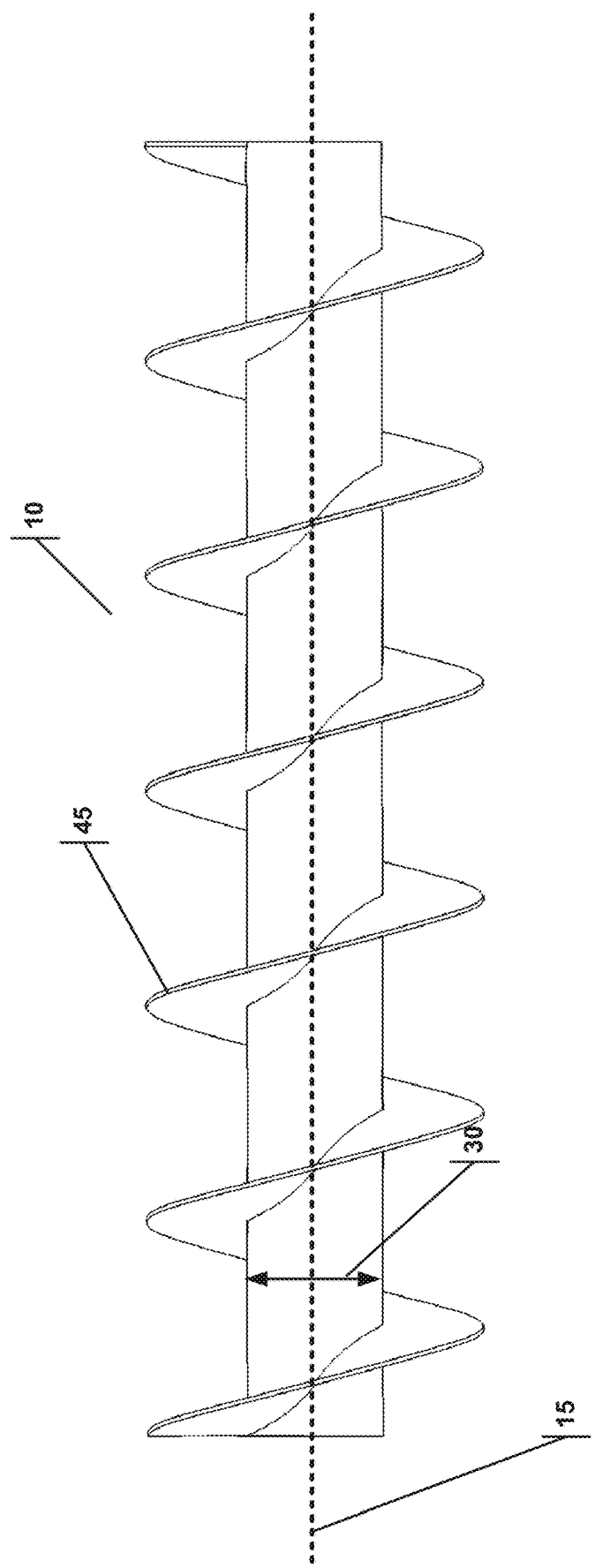
FIG. 2B is a top view of a disc with the major axis facing up.

The major axis 30 and minor axis 35 are shown in greater detail with reference to FIGS. 2A and 2B. FIG. 2A shows the disc 10 with the minor axis 35 in the plane of the paper. Rotating this structure 90 degrees, as shown in FIG. 2B, places the major axis 30 in the plane of the paper.

A more general form of describing the multi-lobe non-circular hub will now be disclosed. In this more general form, hubs with two or more lobes may be created. For example, in FIGS. 16A and 16B, a three-lobed non-circular hub 140 and a five-lobed non-circular hub 145 are shown. A helical ridge 45 may be applied to these hubs. Generalizing on the previously disclosed two-lobe design, FIGS. 3B-3D show a disc 10 with a longitudinal axis 15 and includes a hub 20 extending a length along the longitudinal axis 15. The longitudinal axis 15 is coaxial with the center of the hub 20, and the hub 20 further includes a hub surface 25 and a plurality of lobes N. In the case shown, N is equal to 2. Each lobe extends along the longitudinal axis 15 and each lobe has a peak 150 with a corresponding peak radius 155 measured from the center of the hub 20 to the hub surface 25 at the peak 150. Each lobe has a peak radius that is substantially the same as the peak radius of the other lobes, and each lobe peak 150 is 360/N degrees apart from each other, as defined by the angles formed between the peak radius of adjacent lobes. As shown in FIG. 3D, the peaks 150 are 360/2, or 180 degrees apart. In FIG. 16A, the three-lobe hub 140 has three peaks at 360/3 (120 degrees apart), and in FIG. 16B, the five-lobed hub 145 has five peaks at 360/5 (72 degrees apart).

The peak radius 155 is larger than the non-peak radius 160, as defined by the measurement from the center of the hub 20 to the hub surface 25 between the peaks 150 of adjacent lobes. A helical ridge structure 45 extends away from hub surface 25 and twists at least 360 degrees about the longitudinal axis 15 for the length.

Figure 3A:
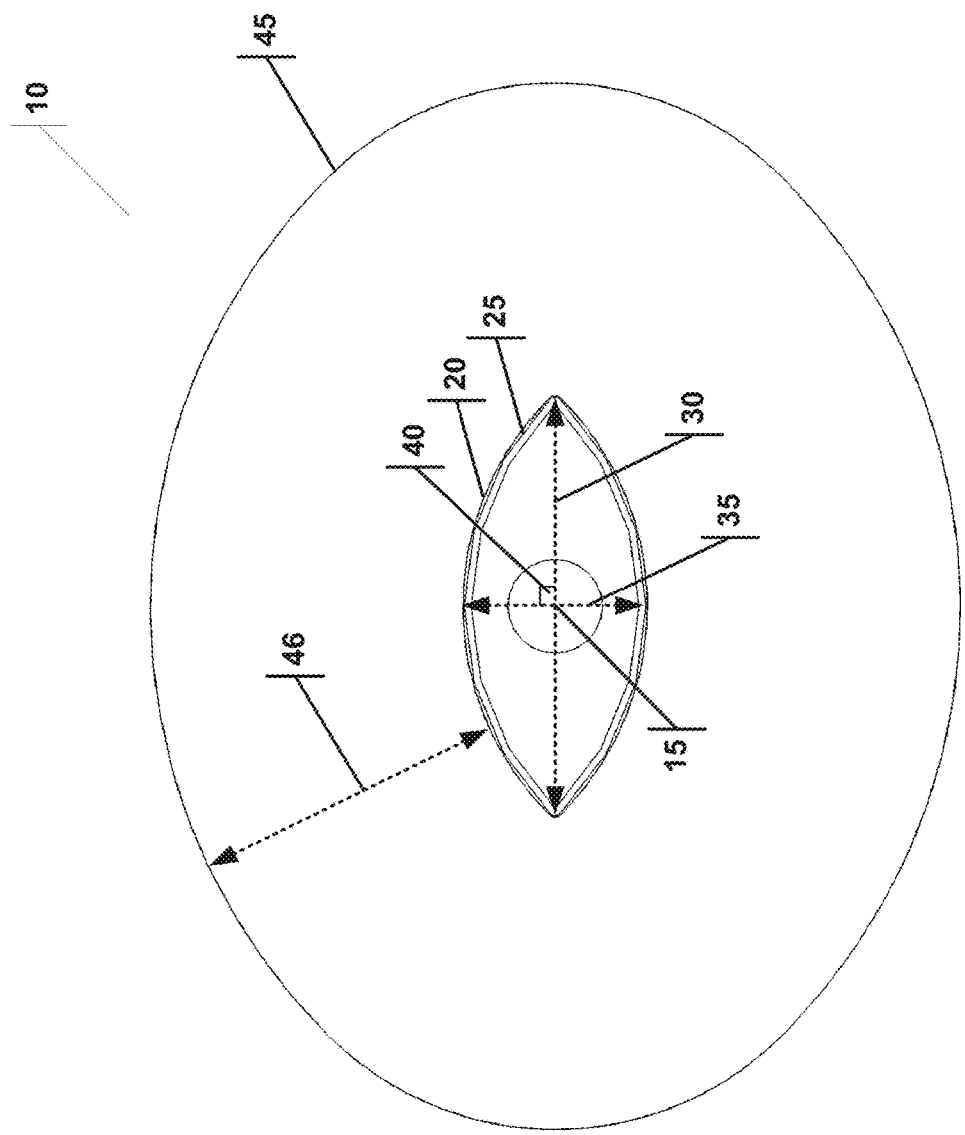
FIG. 3A is a cross-sectional view of a disc, taken perpendicularly to the longitudinal axis of the disc.
Figure 3B:
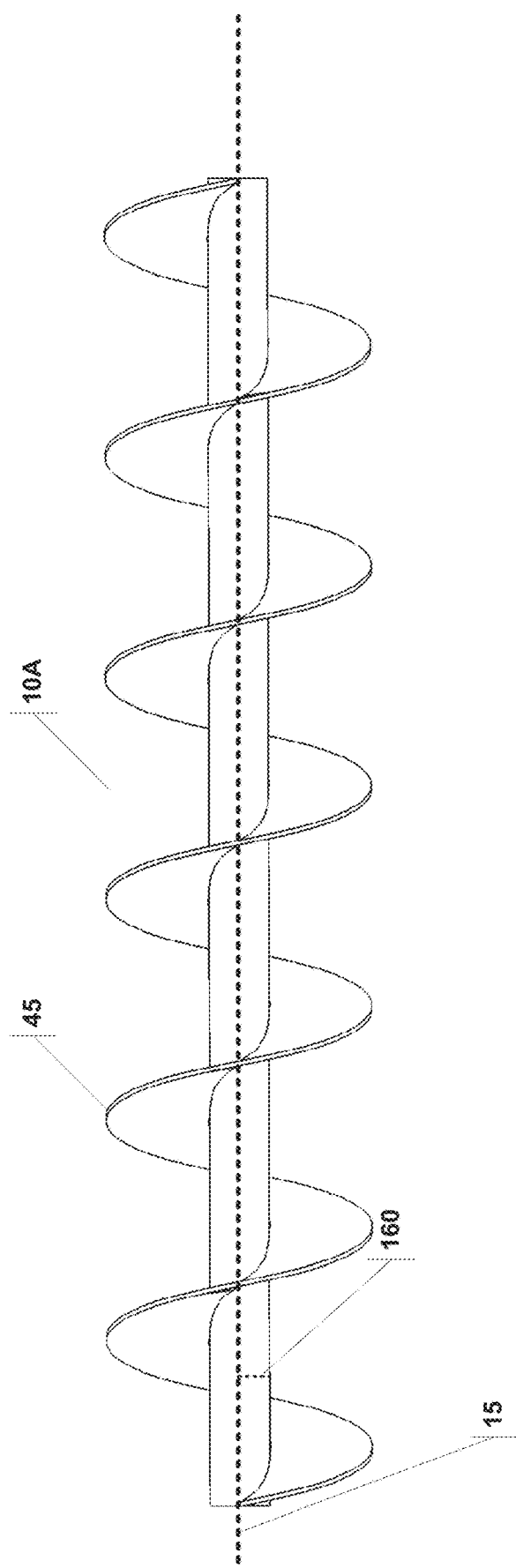
FIG. 3B is a top view of a multi-lobe disc with the smaller axis facing up, presented for a more generalized case.
Figure 3C:
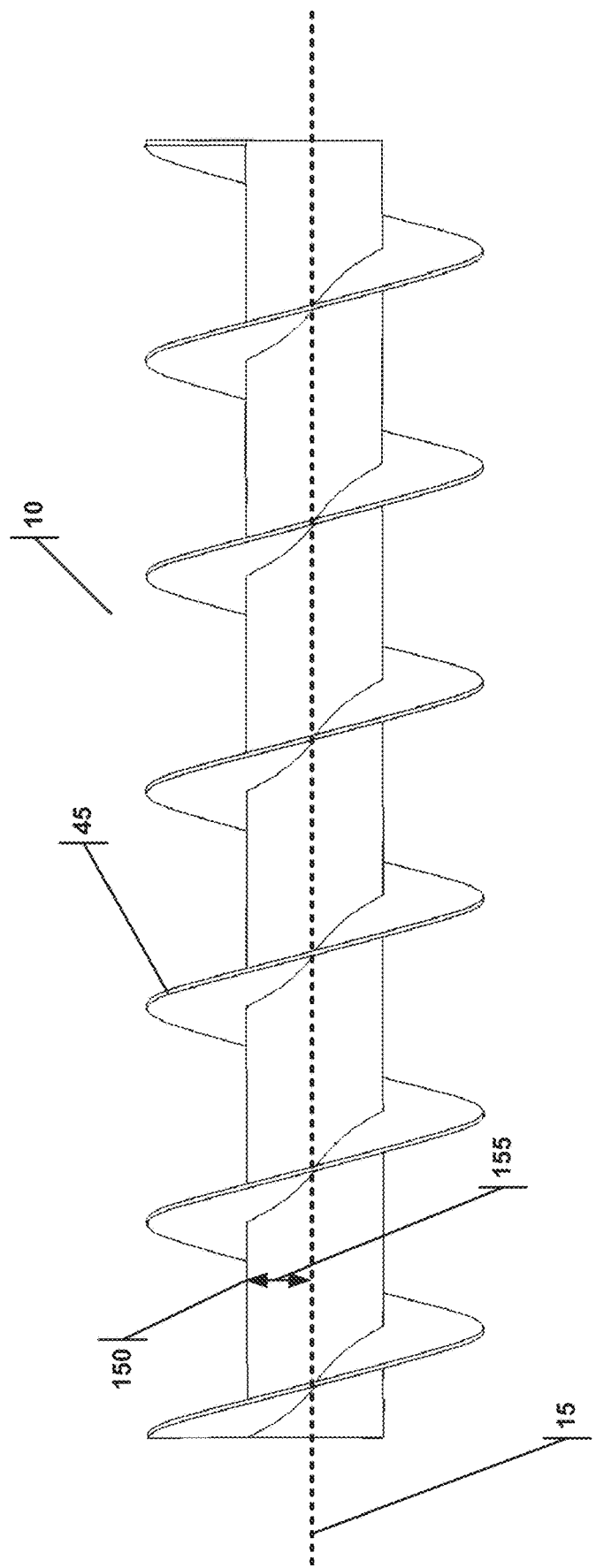
FIG. 3C is a top view of a multi-lobe disc with the larger axis facing up, presented for a more generalized case.
Figure 3D:
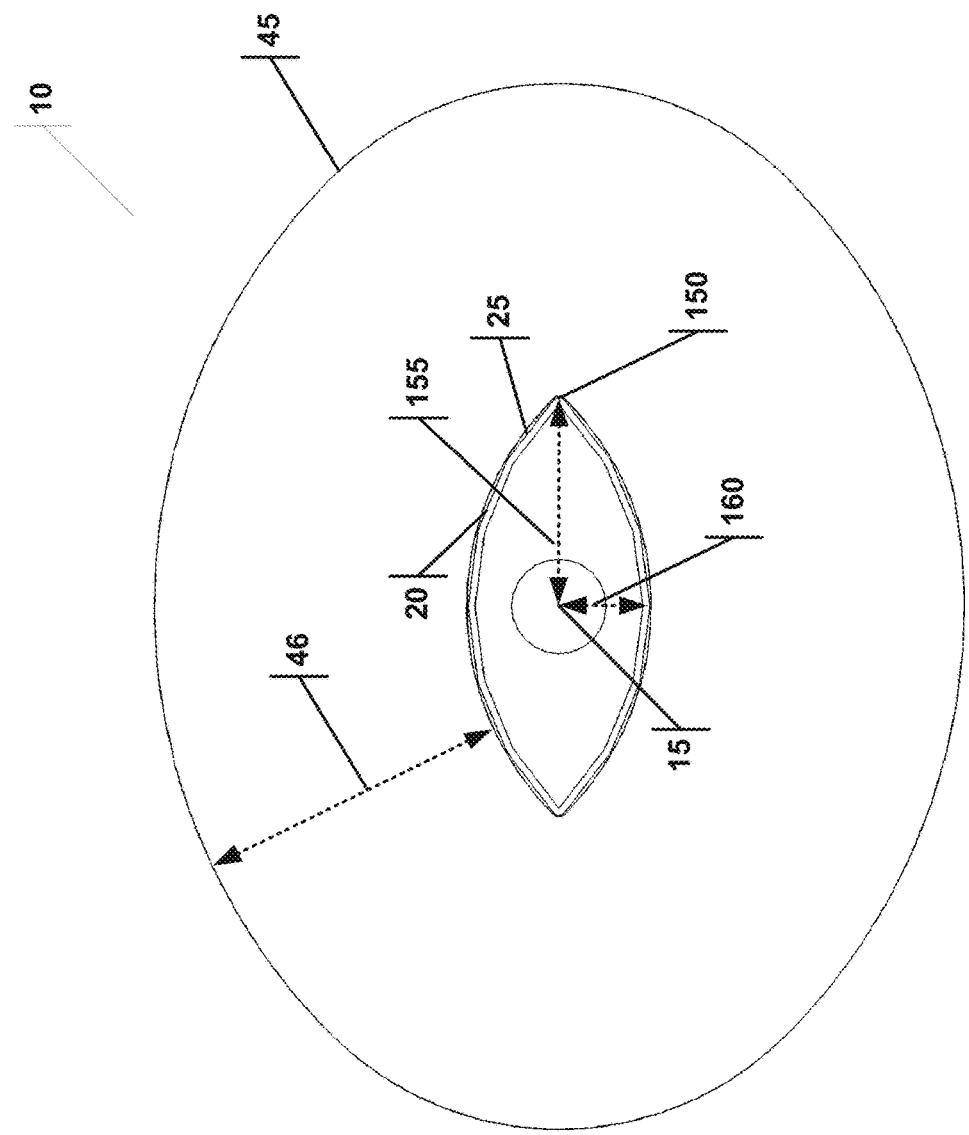
FIG. 3D is a longitudinal view of a multi-lobe disc, presented for a more generalized case.

FIGS. 3A and 3D illustrate that the helical ridge 46 may extend away from the hub surface 25 at a constant height for the length of the helical ridge.

Figure 12:
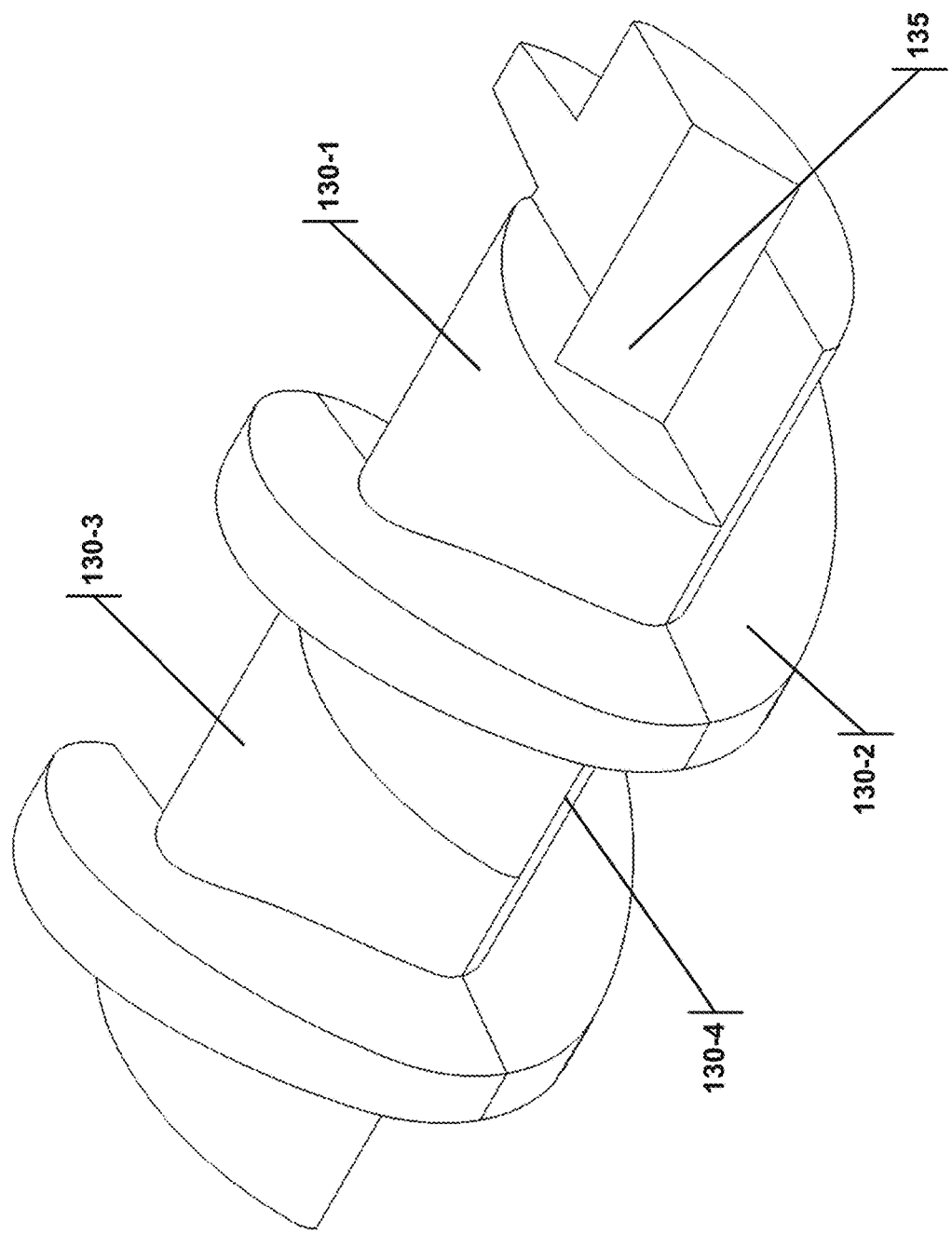
FIG. 12 is an isometric view of four disc halves assembled together with non-aligned staggered splices.
Figure 13A:
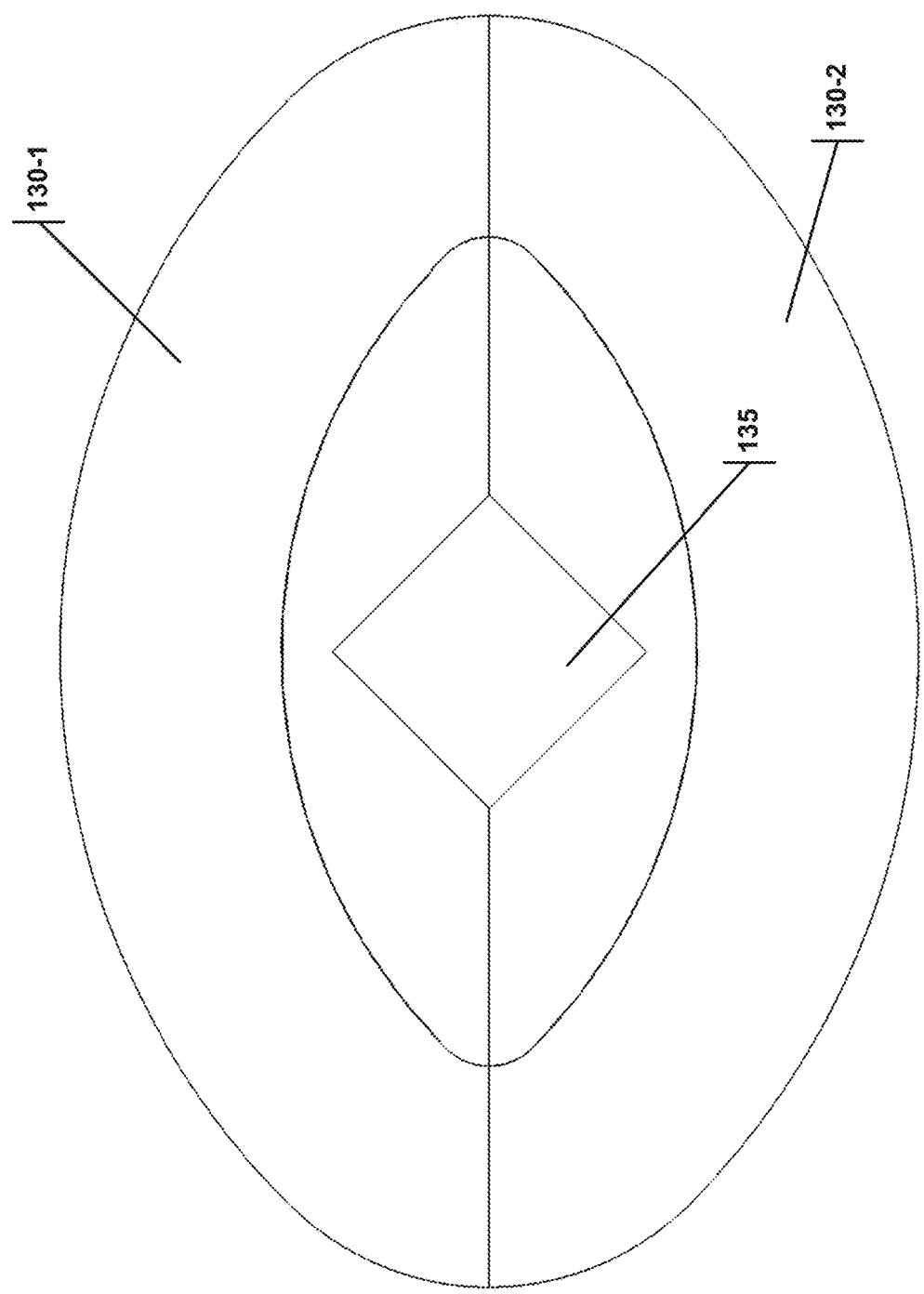
FIG. 13A is an end view of four disc halves assembled together with non-aligned staggered splices.
Figure 13B:
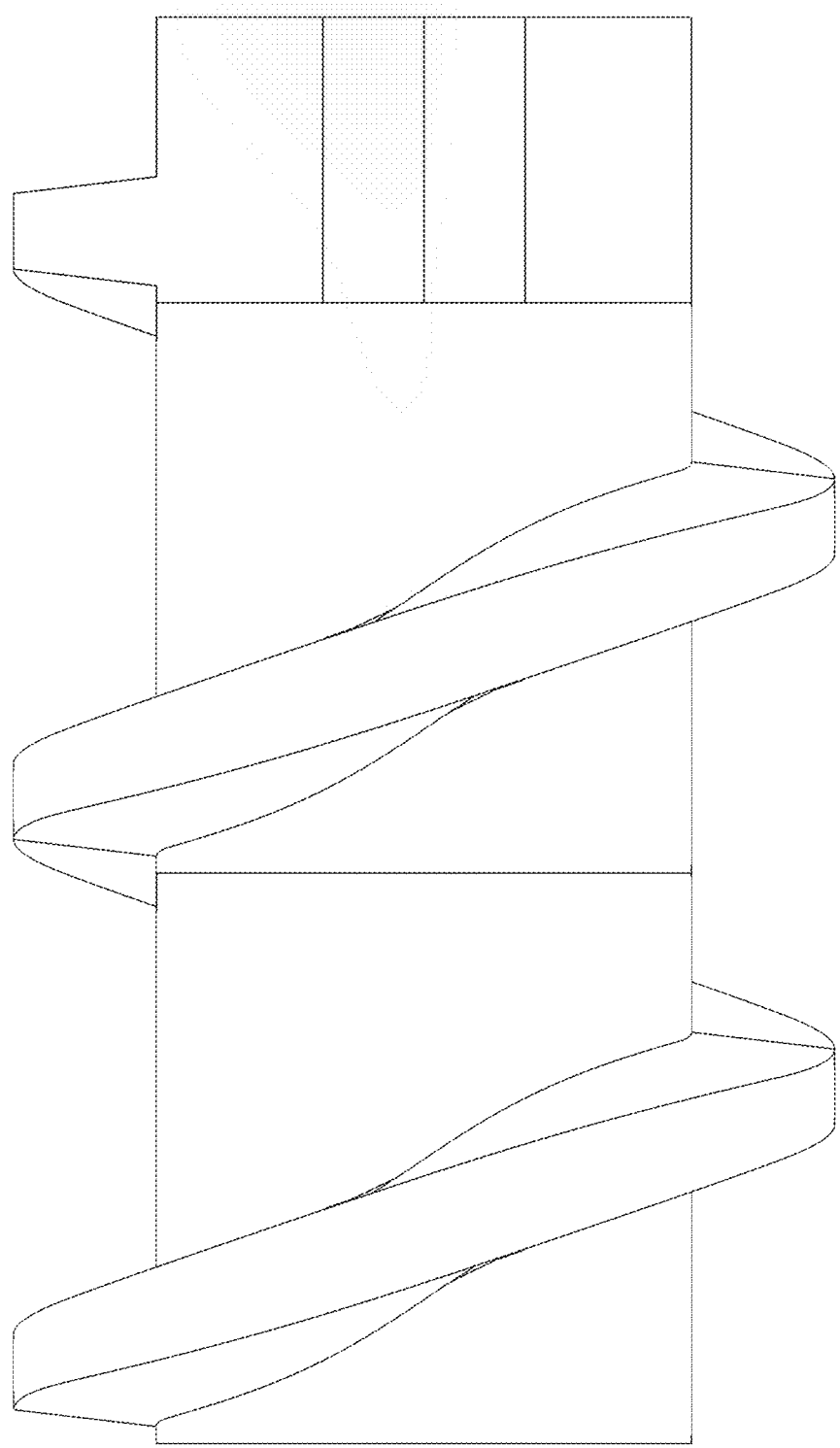
FIG. 13B is a top view of four disc halves assembled together with non-aligned staggered splices.
Figure 13C:
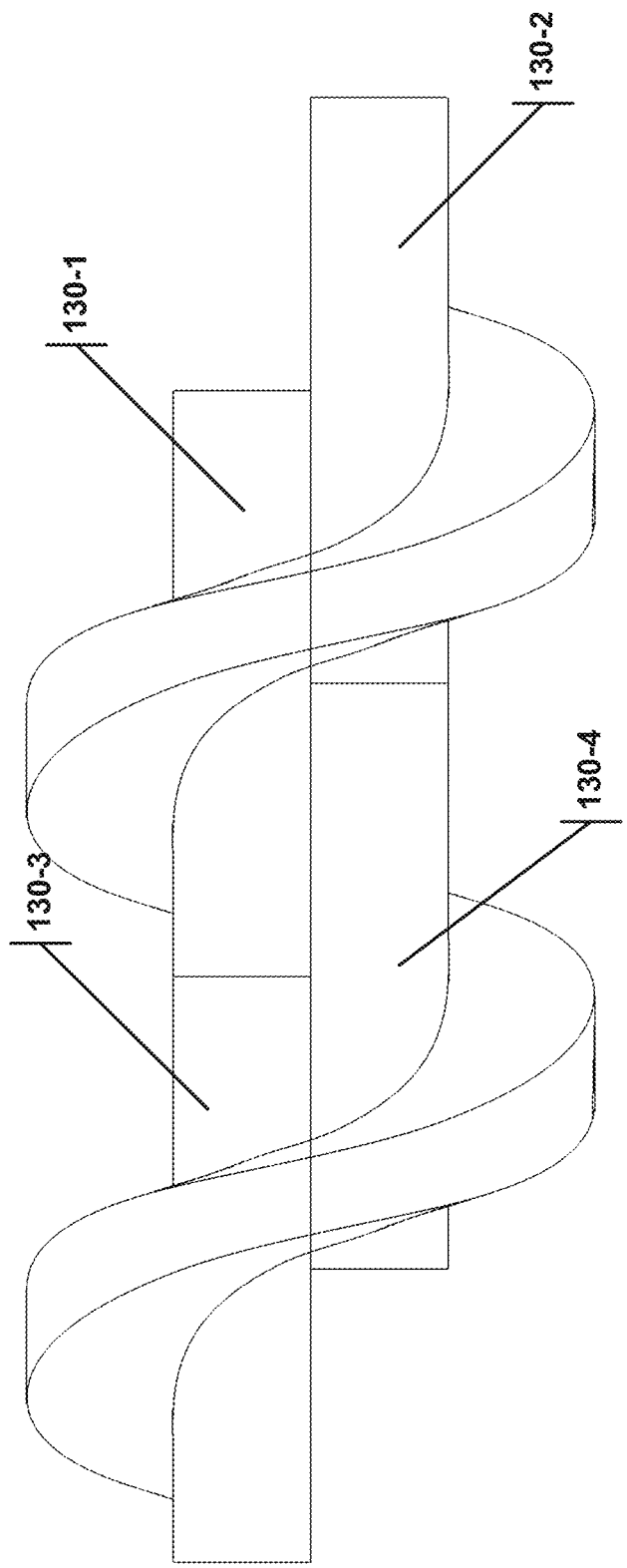
FIG. 13C is a side view of four disc halves assembled together with non-aligned staggered splices.

FIGS. 11A-11D illustrate how the multi-lobe auger-type disc may be constructed from multiple parts. Specifically, a disc half 130 is shown, and it has an inner hub keyed surface/hole 135 that may be placed over a powered shaft (not shown). FIGS. 12-13C show how these disc halves 130-1, 130-2, 130-3 and 130-4 may be joined in a staggered configuration to form a multi-lobe auger-type disc. Each of these disc halves may be identical, making the manufacture of them less costly. This split disc design is replaceable on a shaft, without disassembly of the shaft and/or removal of other discs therefrom. The split disc is designed to separate into two portions, with screws or other fasteners holding the halves together. The inner hub keyed surface/hole 135 is designed to fit on the rotatable powered shaft (not shown). The hole 135 comprises planar sections that can make planar contact with the powered shaft (which in the illustrated case would have a square cross-section). Because of the design of the split disc, the disc halves 130 are clamped around the power shaft, and the planar sections of the hole 135 make contact with the flat sides of the rotatable shafts (in the illustrated case, at four clamping surfaces). This allows the split disc to clamp or grab the power shaft such that it will not freely spin on the shaft.

FIGS. 9A-10B illustrate the helical ridge structure.

Figure 14:
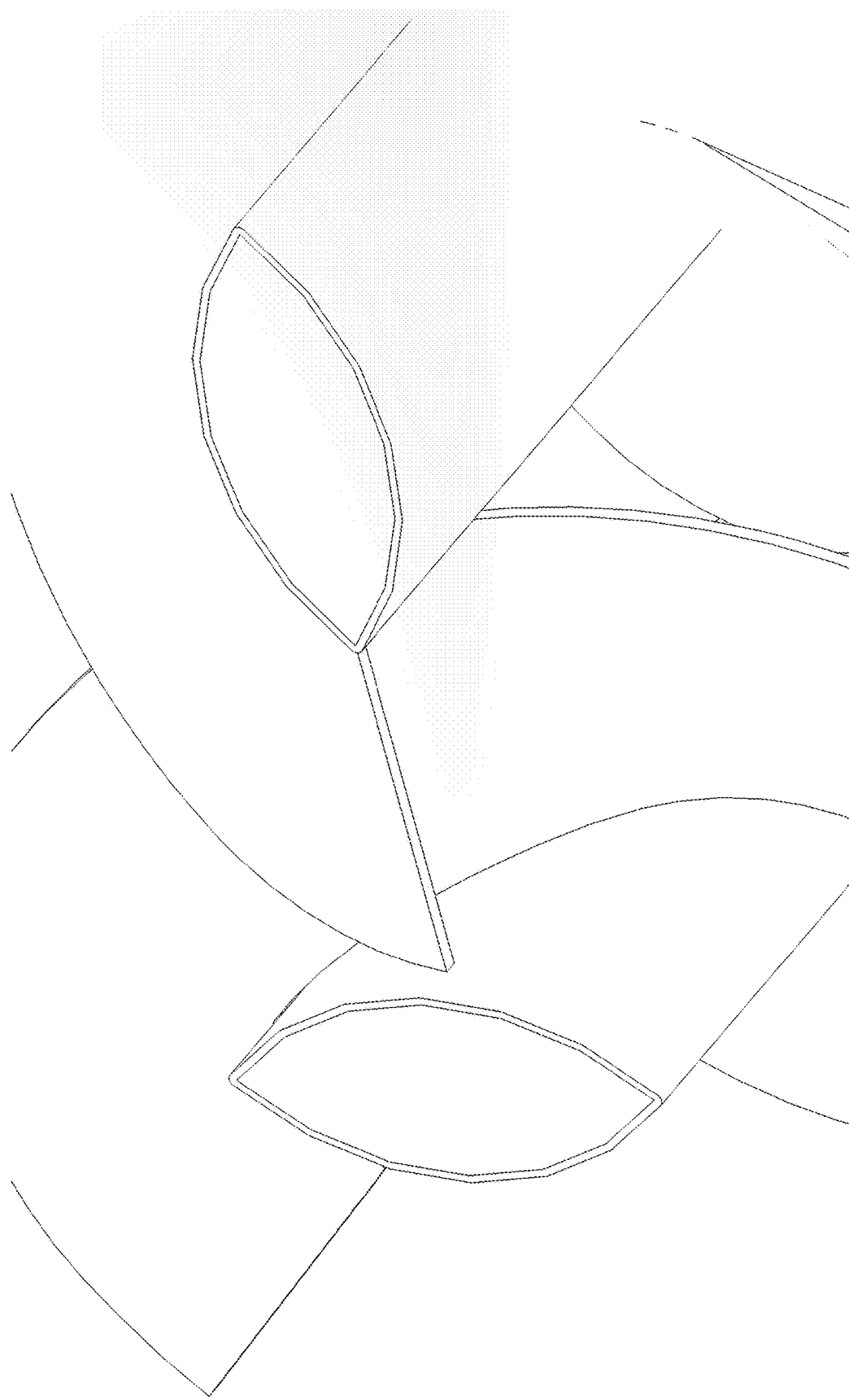
FIG. 14 is a close-up view of two adjacent interleaved discs that are 90 degrees out of phase with each other.

Now a multi-lobe auger-type disc screen will be discussed. Referencing FIG. 4A, discs of the construction already described are placed adjacent to each other where the helical ridge structure 60 from the first disc 50 is interleaved (shown at interleave position 70) with the helical ridge structure 65 of the second disc 55. The discs rotate in direction 85. Where there is an even number of lobes, the first disc 50 is positioned out of phase from the second disc 55 by 90 degrees (as shown by arrow 75), and where the number of lobes N is odd, the adjacent discs are placed 0 degrees out of phase from each other. FIG. 14 is a close up of two discs interleaved with each other, where one disc is 90 degrees out of phase from the other.

Figure 4A:
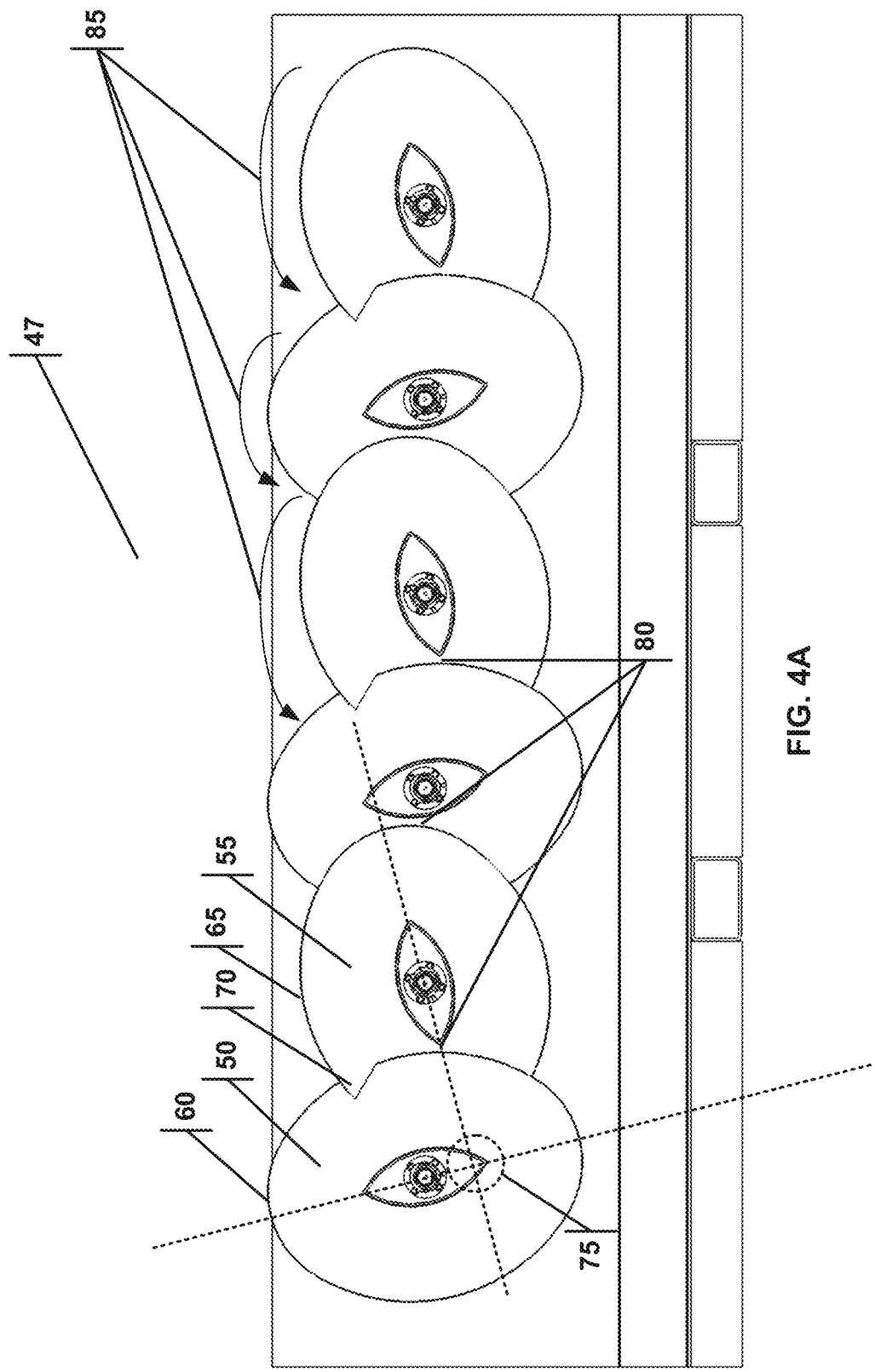
FIG. 4A is an end view of a set of discs interleaved with one another.

The outer edge of the helical ridge of the first disc creates a gap with the hub surface of the adjacent second disc (shown at position 80 in FIG. 4A). When the two discs are rotated in the same direction, the width of the gap remains substantially constant.

Figure 4B:
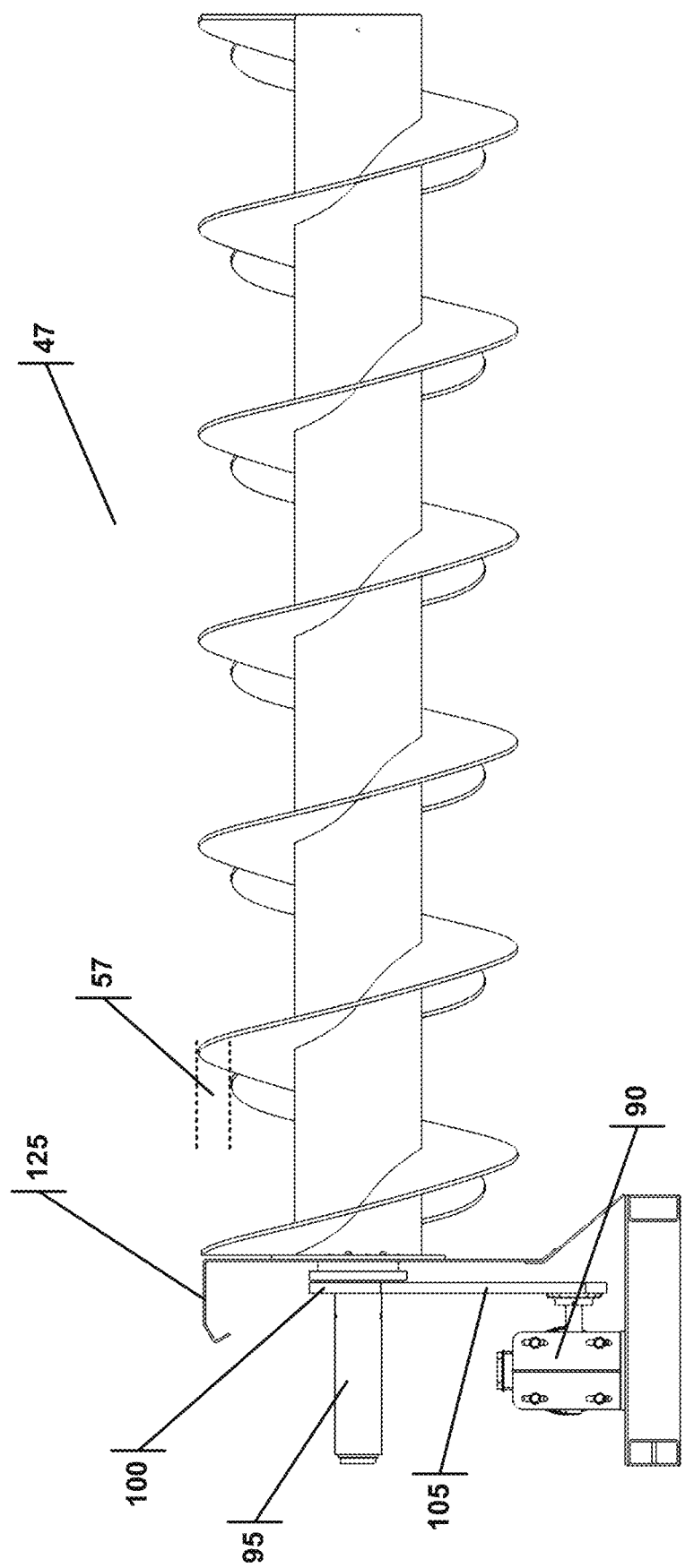
FIG. 4B is an end view of a set of discs interleaved with one another and illustrates the amplitude difference.
Figure 4C:
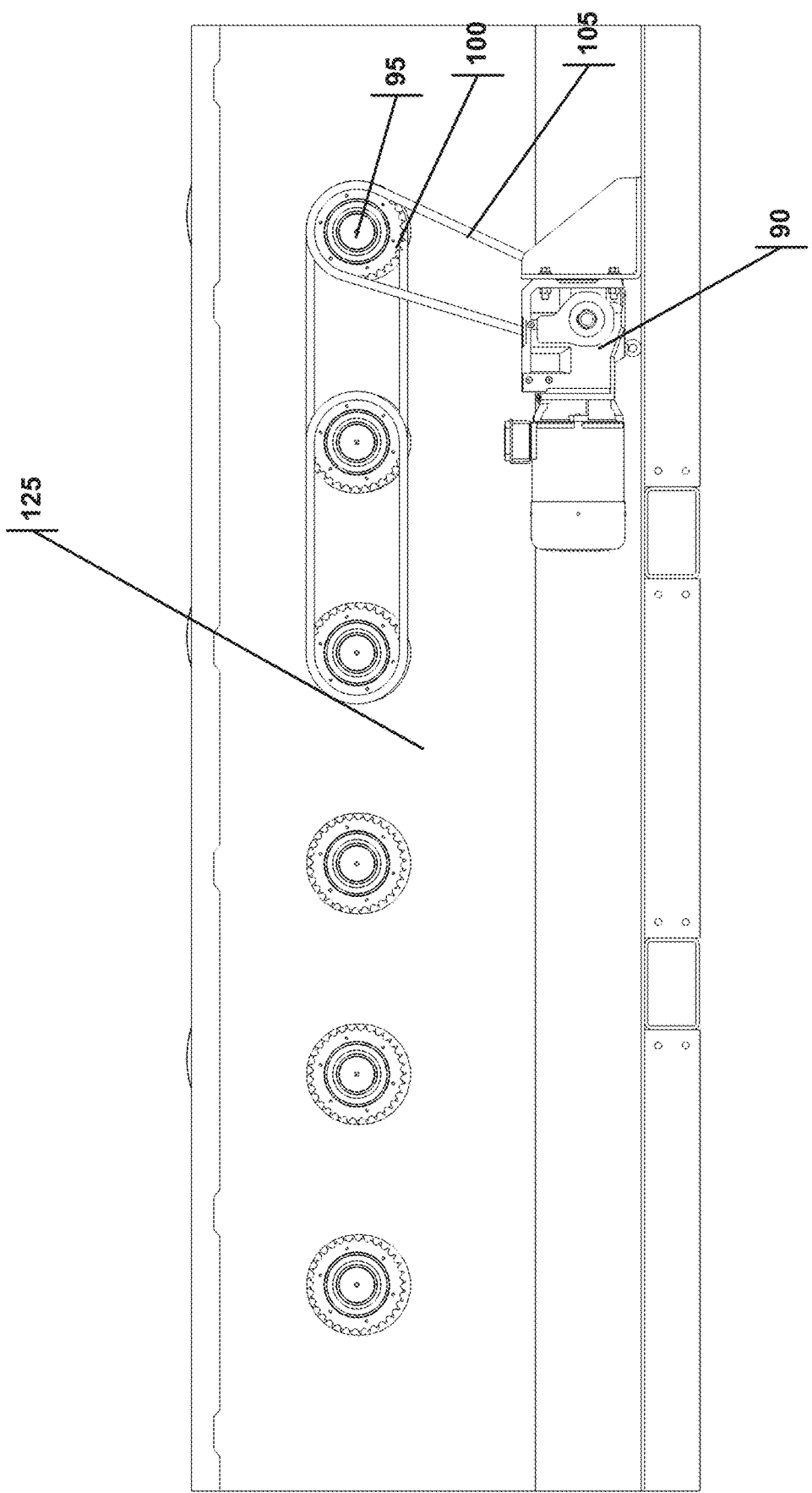
FIG. 4C is a side view of a disc screen with drive components.

FIGS. 4B and 4C show a disc screen 47 with two adjacent multi-lobe auger type screens, each mounted to a power shaft 95 that is powered by a motor 90 via a chain/belt 105 and a gear 100. The various shafts may be held in place by the shaft retention plate 125. This view shows the amplitude difference 57 of the helical ridge 45. The front disc has its major axis in the plane of the paper, while the back disc is 90-degrees out of phase with the minor axis in the plane of the paper. The difference of the height of the helical ridges of adjacent discs is the amplitude difference 57.

Figure 5A:
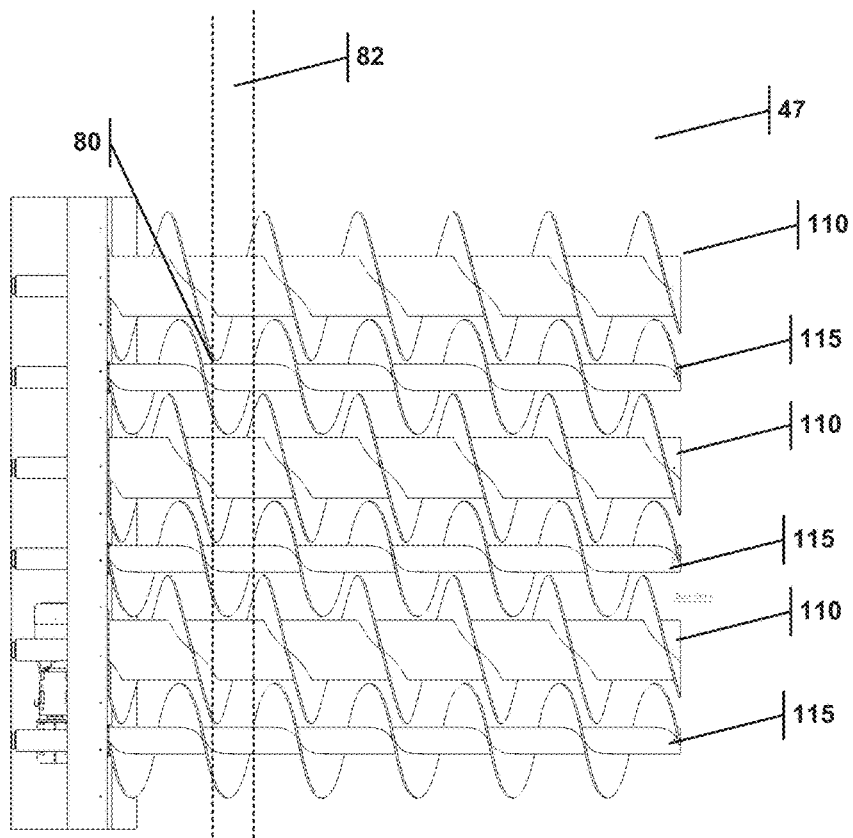
FIG. 5A is a plan view of a disc screen.
Figure 5B:
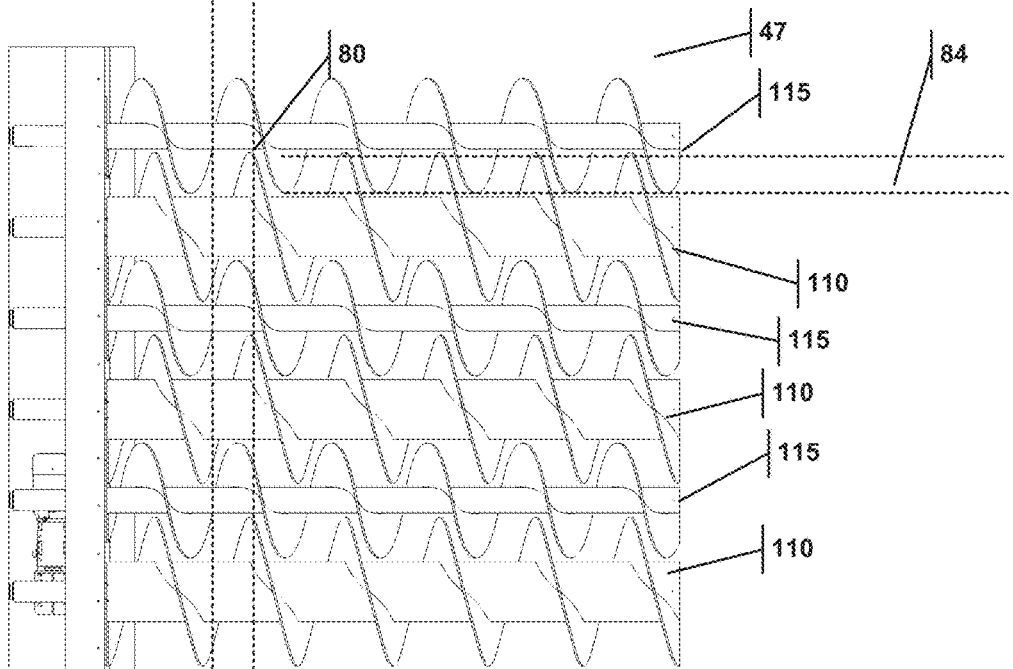
FIG. 5B is a plan view of a disc screen where the individual discs have rotated 90 degrees from FIG. 5A.

FIGS. 5A and 5B are intended to show how the gap 80 moves along the direction of the longitudinal axis of the first disc, but the gap relative to the center of the hub of the disc is not substantially constant. In FIG. 5A, the set of discs 110 has its hub with the major axis in the plane of the paper. In contrast, the second set of discs 115 has its minor axis in the plane of the paper. Between the discs is a gap 80. In FIG. 5B, all the discs have been rotated 90 degrees. The gap 80 has moved along the longitudinal axis (shown by gap longitudinal movement 82). Also, the position of the gap 80 relative to the center of the hub of the disc is not constant; rather, the gap moves laterally (shown by gap lateral movement 84). It is this longitudinal and lateral movement of the gap 80 that promotes more sifting of the material loaded onto the disc screen, thereby promoting more efficient material fallout 120.

Figure 6:
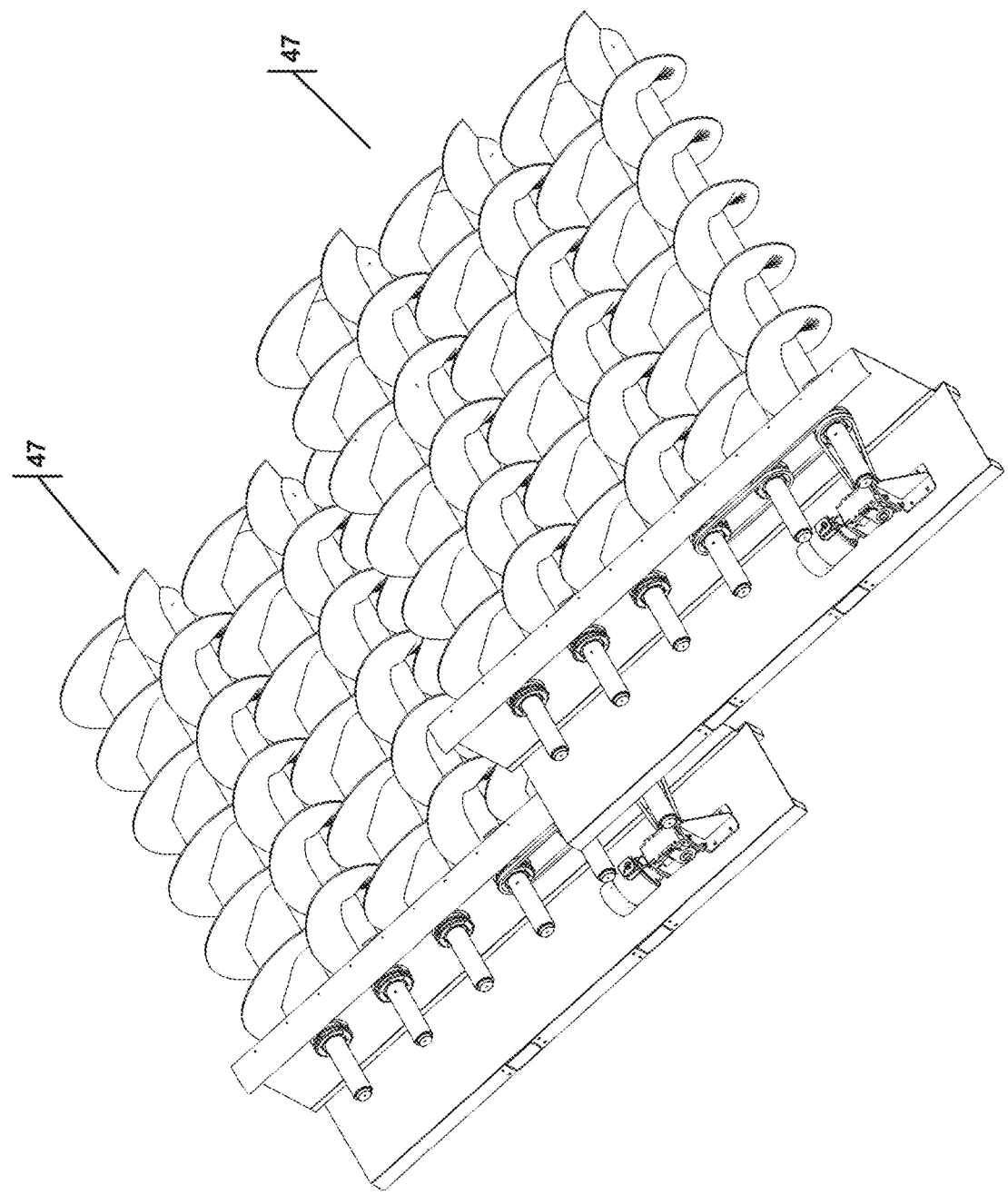
FIG. 6 is an isometric view of an assembled disc screen appropriate for separating cardboard from mixed recyclables.
Figure 7A:
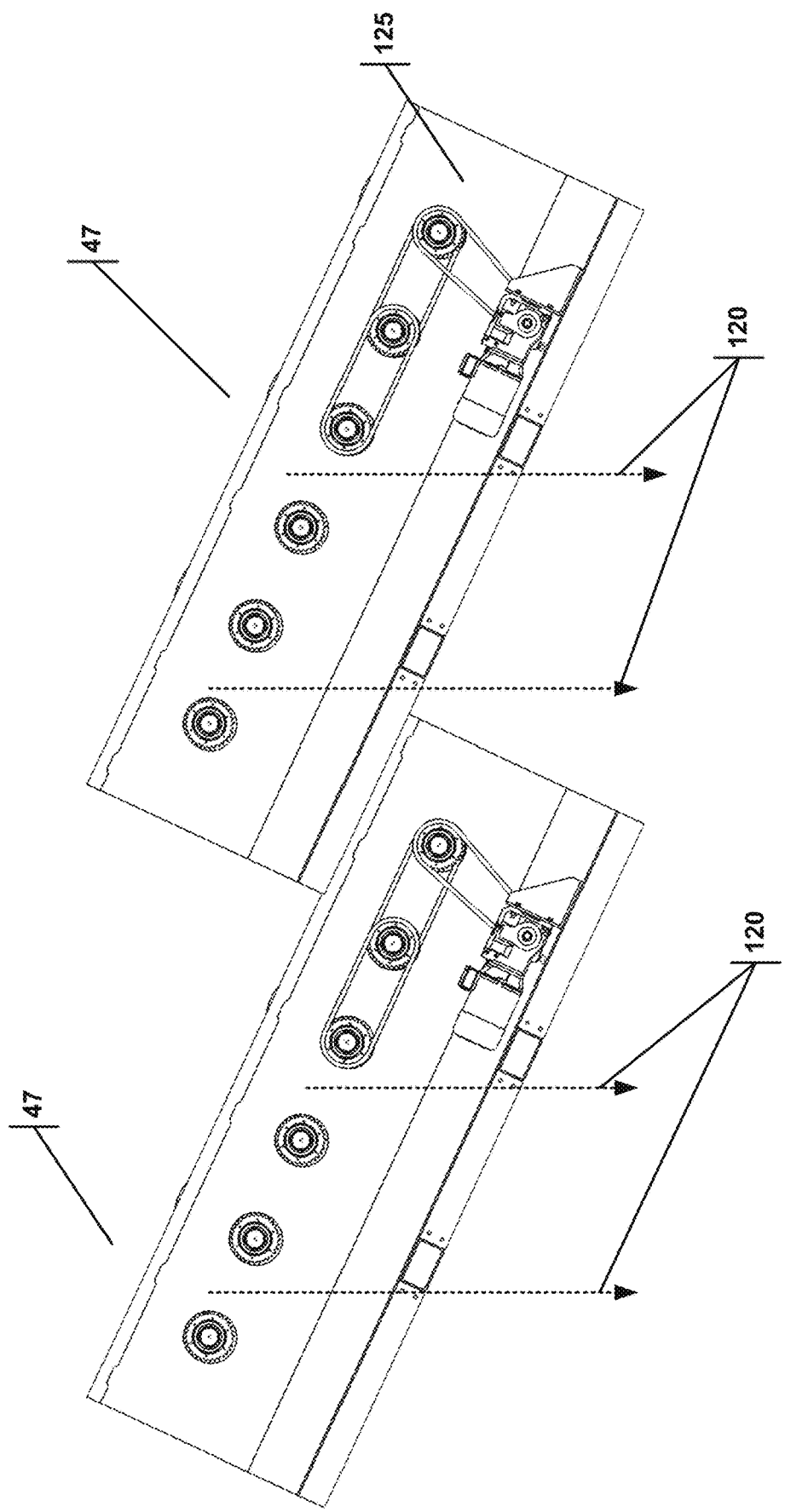
FIG. 7A is a side view of an assembled disc screen appropriate for separating cardboard from mixed recyclables.
Figure 7B:
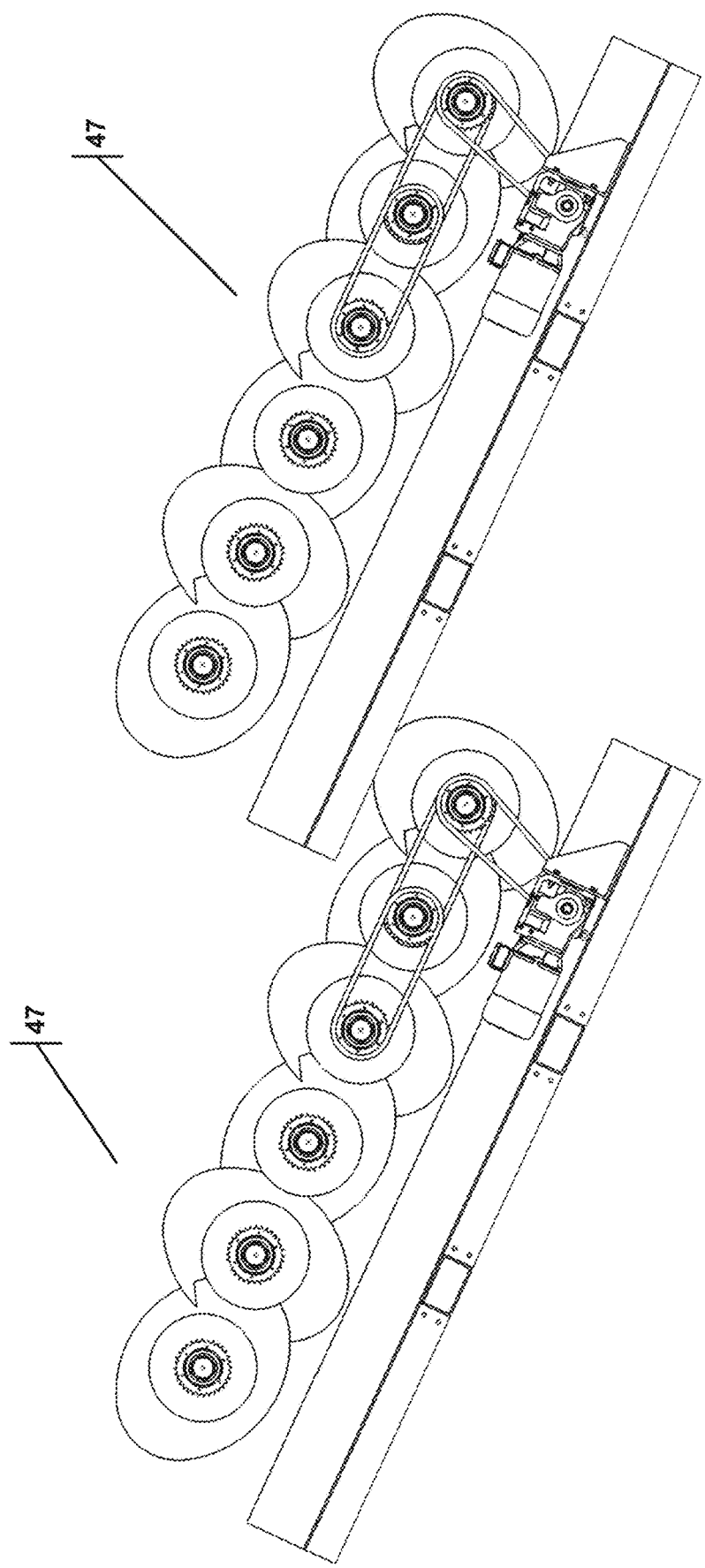
FIG. 7B is a side view of an assembled disc screen appropriate for separating cardboard from mixed recyclables with the axle retention plate removed.
Figure 8:
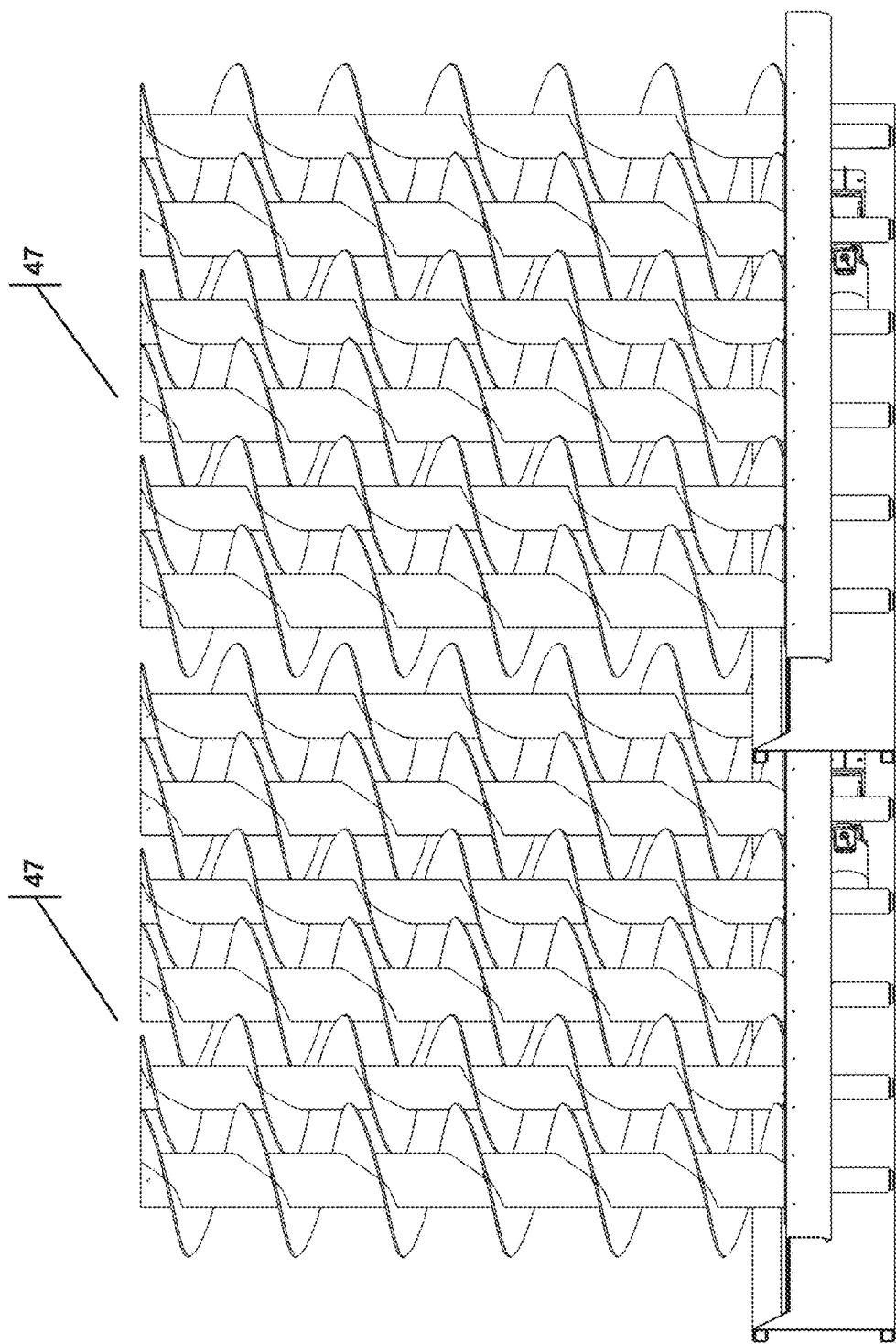
FIG. 8 is a plan view of an assembled disc screen appropriate for separating cardboard from mixed recyclables.

FIGS. 6-8 show two multi-lobe auger-type disc screens, with each screen having an incline. The first disc screen dumps its overload onto the second disc screen, and each disc allows material to fall between the discs (shown by material fallout 120).

It should be clear that some variance in the minimum distance between the outer edge of the helical ridge and the opposing hub is tolerable, and this invention is not limited to devices with strictly zero variance in the minimum distance. For example, many discs are constructed with bumps or treads on the outer edge in order to increase the surface speed of material on the disc screen.

Figure 15:
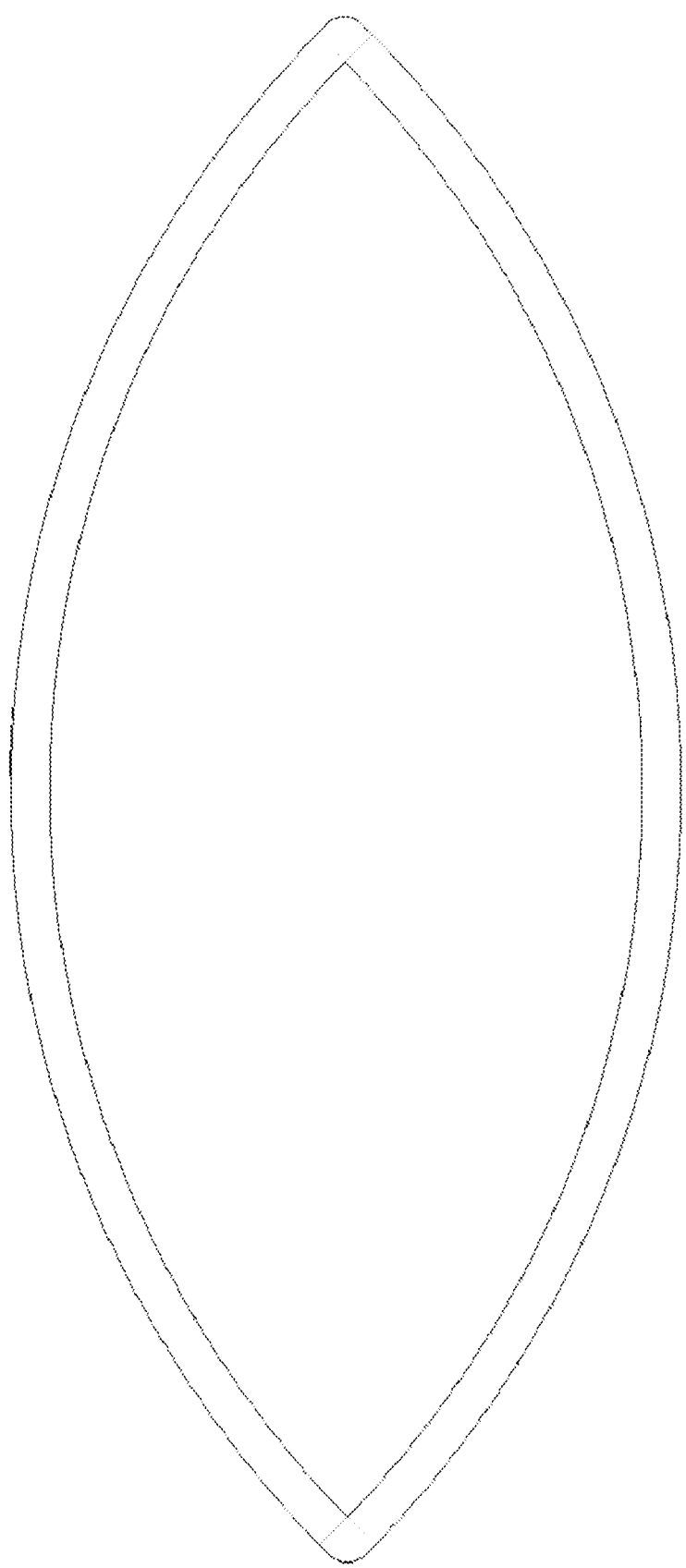
FIG. 15 is a diagram of how to create a non-round tube to match non round discs utilizing two rolled plates seam welded at the long end.

The hub can be formed by bump bending or rolling two pieces of plate metal into appropriately shaped arcs and then fill-welding the corner where the two arcs come into contact, as shown in FIG. 15. Forming the hub out of two arcs is preferable, as it maximizes the agitation of the machine;

however, multi-lobe shaped hubs of three, four, or more arcs can be formed with the arcs seam welded together.

Figure 9A:
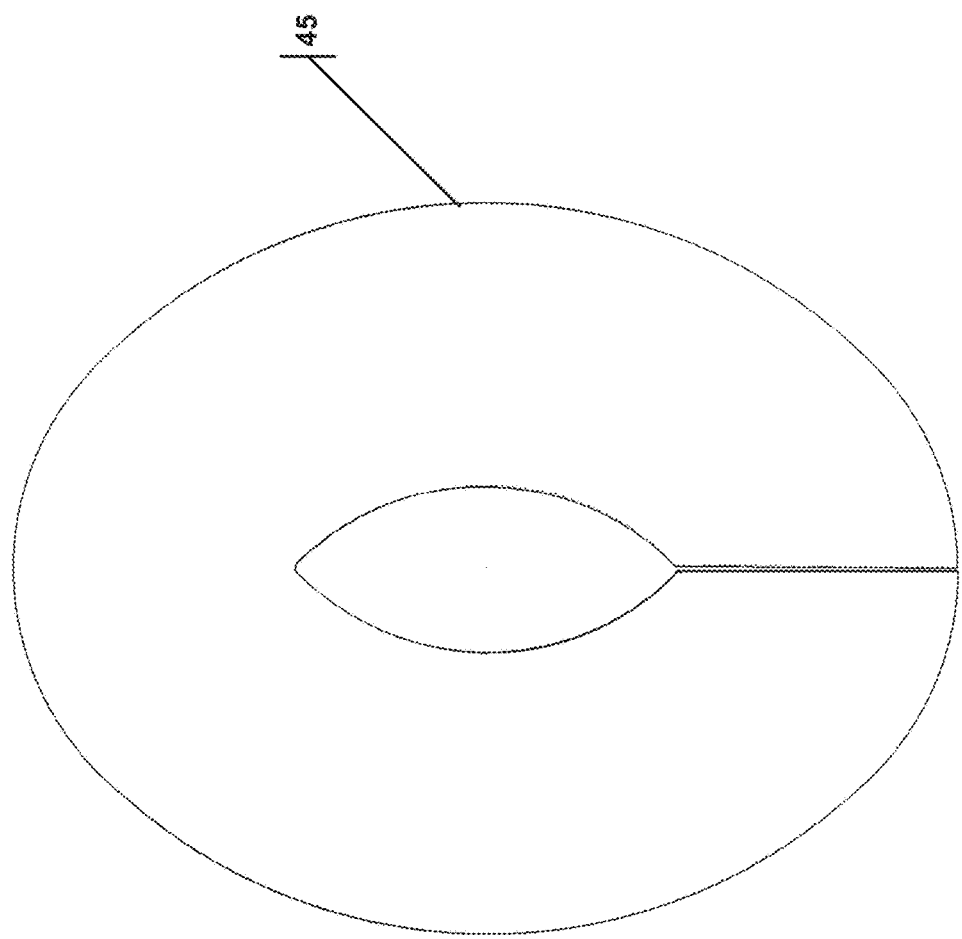
FIG. 9A is a side view of the pattern for the helical ridge.
Figure 9B:
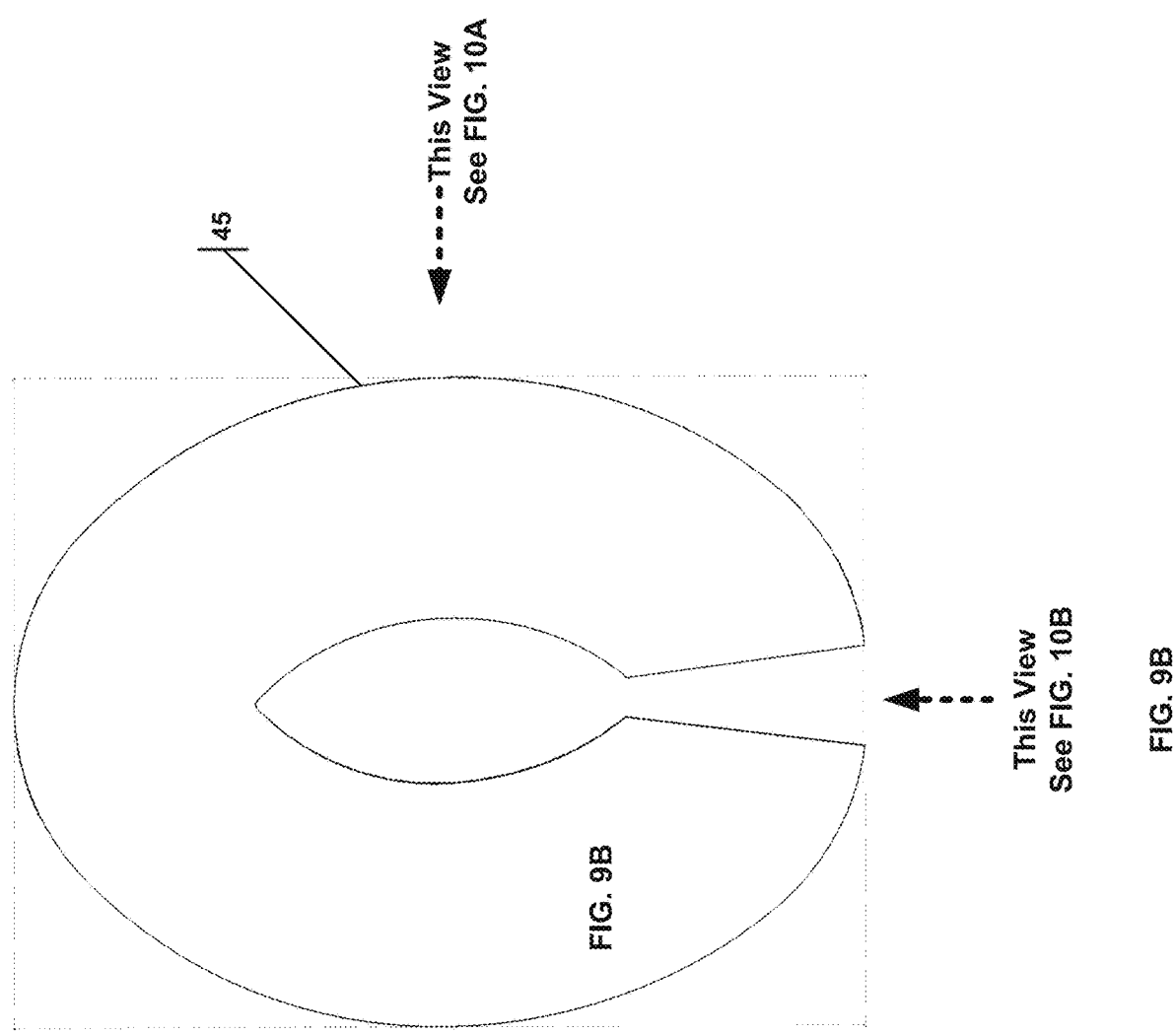
FIG. 9B is a view of a flat pattern for the helical ridge.
Figure 11A:
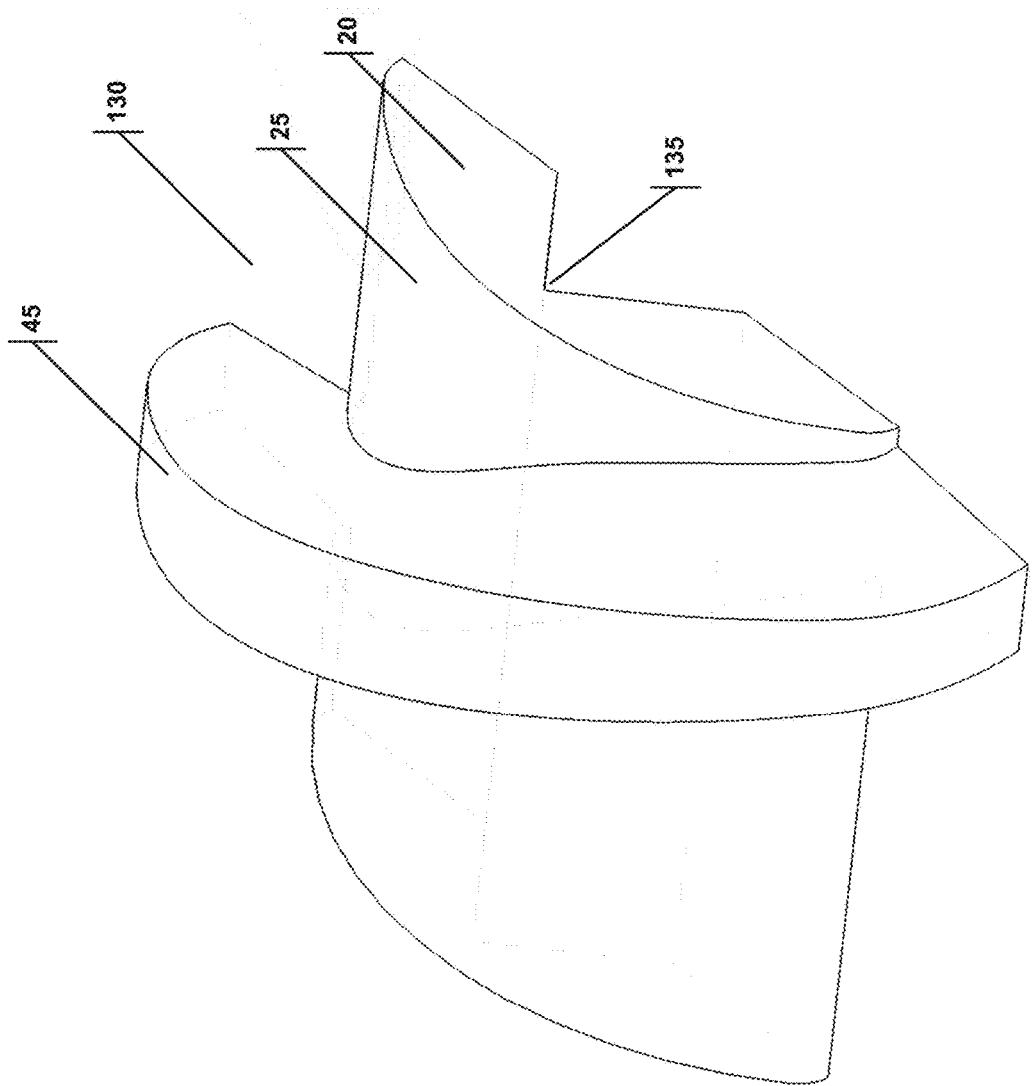
FIG. 11A is an isometric view of a single disc half and a substrate cast from an elastomeric material.
Figure 11B:
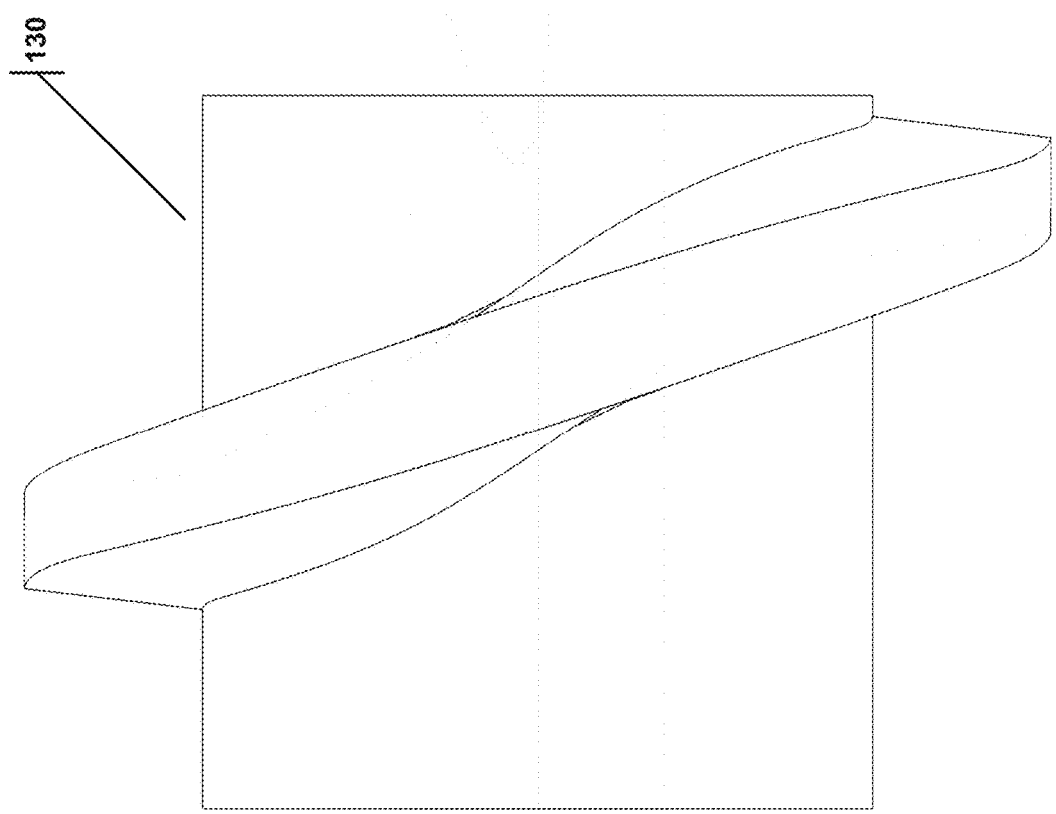
FIG. 11B is a top view of a single disc half and a substrate cast from an elastomeric material.
Figure 11C:
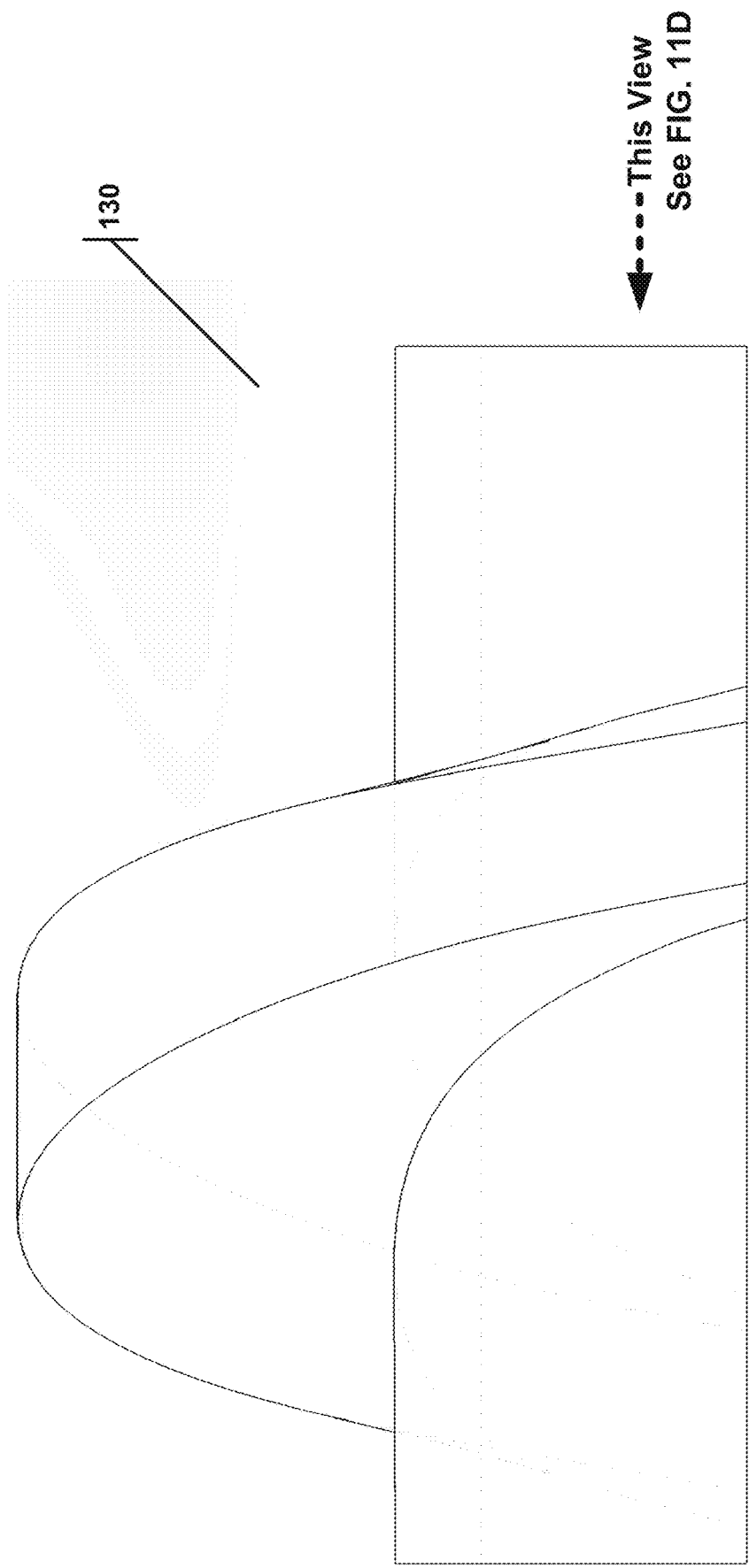
FIG. 11C is a side view of a single disc half and a substrate cast from an elastomeric material.
Figure 11D:
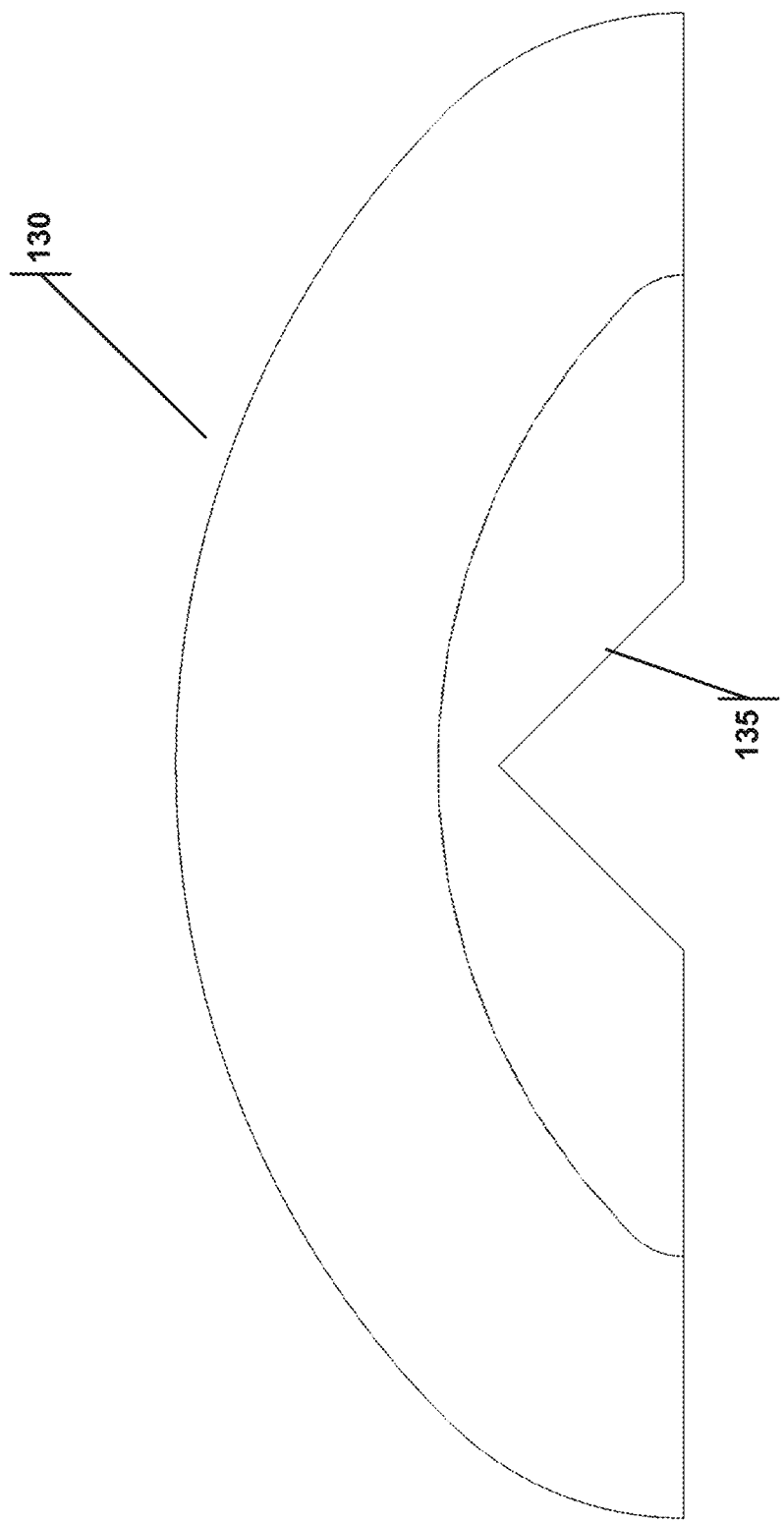
FIG. 11D is an end view of a single disc half and a substrate cast from an elastomeric material.

The helical ridge can be formed by first cutting the flat pattern of the disc out of sheet metal or some other appropriate material (FIG. 9A). The helical ridge can then be shaped in the longitudinal direction utilizing cold forming techniques, such as bump forming, roll forming, or deep drawing (FIGS. 9B-10B). It is preferable to stack each helical ridge onto the appropriate hub and weld it in place. This may be performed in sections where the trailing edge of on section is welded to the leading edge of the next section. This prevents any hard edges from being present within the disc screen, as hard edges can grab and wrap materials. It is also possible to form the described shapes out of molded elastomeric materials such as rubber or plastic.

Figure 17A:
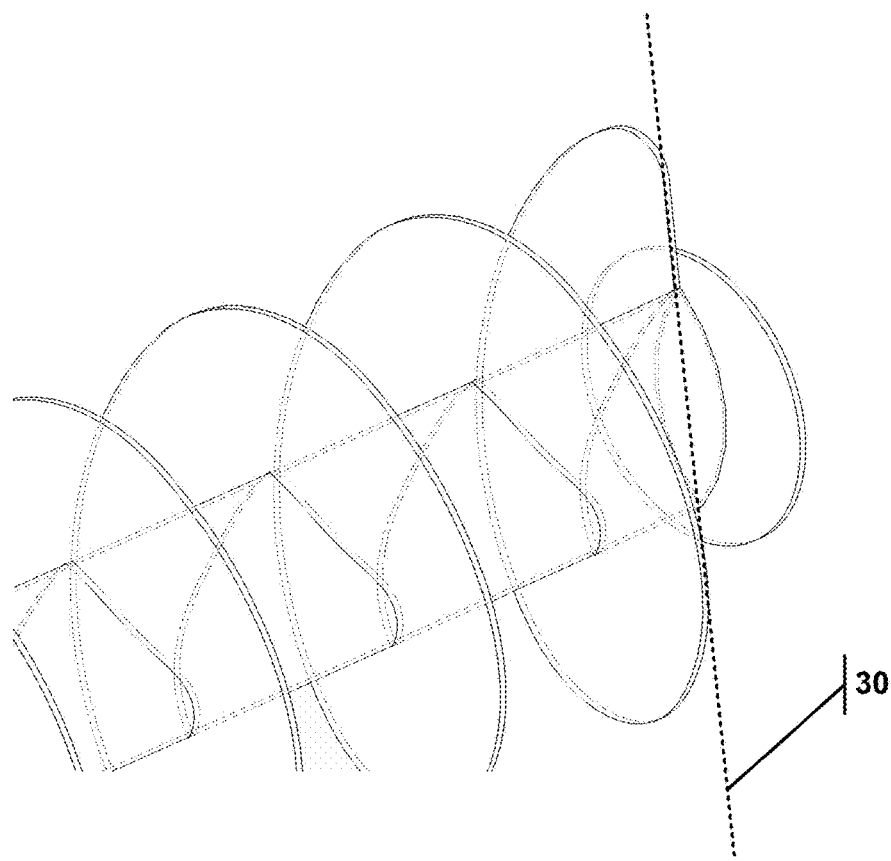
FIG. 17A illustrates a disc where the helical ridge starts at a first angle.
Figure 17B:
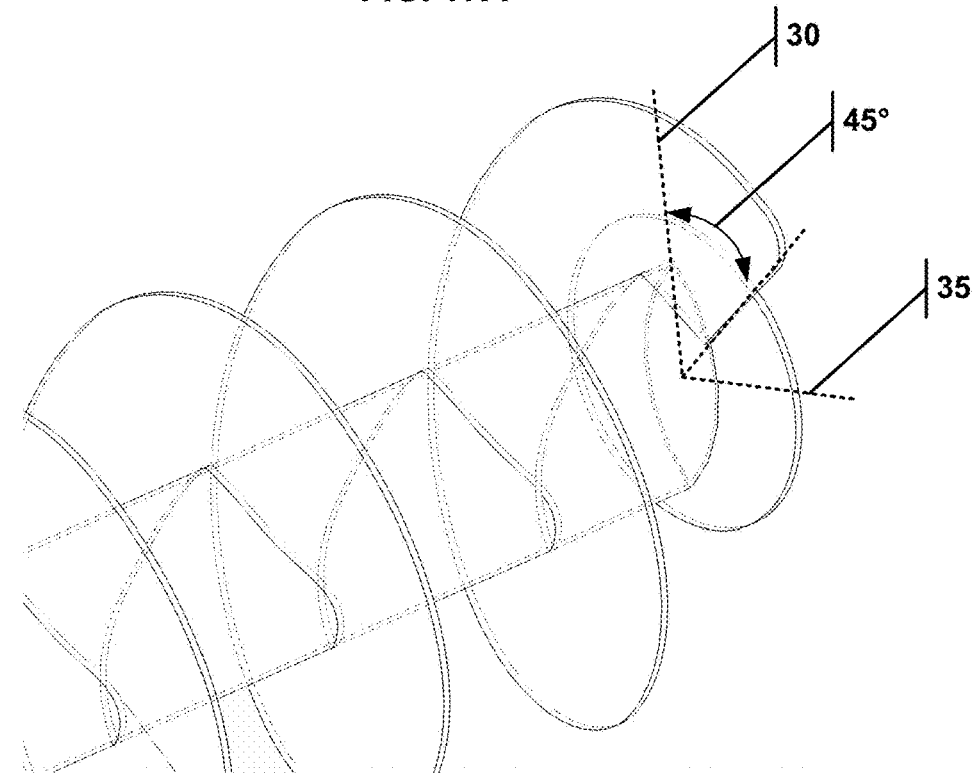
FIG. 17B illustrates a disc where the helical ridge starts at a second angle.

When the preferred embodiment of a two-lobed disc is used, it is sometimes necessary to use different discs in adjacent positions. Referring to FIG. 17A, the disc has the helical ridge that begins at the major axis 30. In an adjacent disc shown in FIG. 17B, the helical ridge begins at a position between the major axis 30 and minor axis 35 (shown as 45 degrees from the major axis 30, which is the angle formed by the intersection of the major axis with a line taken from the hub surface at the helical ridge starting position to the center of the hub). Using this same measurement convention, in FIG. 17A the starting position of the helical ridge is 0 degrees, so that the first angle from the disc in FIG. 17A is not equal to the second angle from the disc in FIG. 17B. When the discs from FIGS. 17A and 17B are adjacent to each other, they are positioned out of phase from each other by 90 degrees. The position of the helical ridge can be adjusted from 0 to 179 degrees, depending on the fit of the adjacent discs and the desired opening. It is not necessary to alternate starting points on each sequential disc once a fitting set is found. It may be beneficial to use three or more starting positions in sequence. For example, the first disc is 0 degrees, the second is 45 degrees, the third is 90 degrees, the fourth is 135 degrees, the fifth is 180 degrees, and thus the pattern repeats. The difference in the start positions of the helical ridges allows the adjacent discs to interleave more tightly with one another. This variable helical ridge starting position is not limited to the two-lobe disc design, but may be applied more generally to the multi-hub disc.

Traditional auger screens have an issue in that material tends to be poorly distributed across the disc screen deck. Because the disc screen has conveyance in two directions, in the forward direction caused by the rotation of the outer edges of the helical ridge, and in the side direction caused by pushing from the helical ridge conveyors, a triangular pattern of material tends to form on the deck, with half the screening deck uncovered and unutilized. However, a non-round hub, as disclosed herein, creates a bumping and lifting action underneath material trapped in this pocket. This bouncing motion, when combined with the use of inclines (shown in FIGS. 6-8), can induce material to bounce out from its current pocket to a pocket further inside the disc screen. This helps to mitigate the side conveyance effect and reduces the triangular nature of the spread, increases screen deck utilization, and keeps material more centered on the disc screen, which has a further benefit of rendering the gathering of material easier after it has been sorted.

In FIGS. 18A and 18B, an auger-type circular hub disc with axis offset 10A is disclosed. The auger disc 10A includes a central longitudinal disc axis 15 and a hub 21 extending a length along the longitudinal disc axis 15. The longitudinal disc axis 15 is coaxial with the center of the hub 21. The hub 21 further includes a hub surface 25 and a helical ridge structure 45 extending away from hub surface 25 and twisting about the longitudinal axis at least 360 degrees. The auger disc 10A has a disc rotation axis 22 that is parallel to the central longitudinal axis 15 and offset 23 from the center of the hub 21. The auger 10A disc is constructed to rotate about the disc rotation axis 22. The hub disc with axis offset may have a circular hub 21 as shown in FIGS. 18A and 18B, or non-circular 20 as shown in FIGS. 19A and 19B, and may have multiple lobes. The helical ridge 45 may extend away from hub surface 25 at a height that is constant for the length of the helical ridge.

The invention has been described in connection with specific embodiments that illustrate examples of the invention but do not limit its scope. Various example systems have been shown and described having various aspects and elements. Unless indicated otherwise, any feature, aspect or element of any of these systems may be removed from, added to, combined with or modified by any other feature, aspect or element of any of the systems. As will be apparent to persons skilled in the art, modifications and adaptations to the above-described systems and methods can be made without departing from the spirit and scope of the invention, which is defined only by the following claims. Moreover, the applicant expressly does not intend that the following claims "and the embodiments in the specification to be strictly coextensive." *Phillips v. AHW Corp.*, 415 F.3d 1303, 1323 (Fed. Cir. 2005) (en banc).

The invention claimed is:

1. A disc for use in a disc screen comprising:
   a longitudinal disc axis;
   a hub extending a length along the longitudinal disc axis, the hub further comprising:
      a hub surface;
      a helical ridge extending away from the hub surface and forming an outer edge that:
         1. twists about the longitudinal axis at least 360 degrees; and
         2. maintains a substantially constant distance from the longitudinal disc axis throughout the at least 360 degree twist;
      wherein a cross-section of the hub taken perpendicularly to the longitudinal disc axis is non-circular.

2. The disc of claim 1, wherein the hub comprises multiple lobes.

3. The disc of claim 1, wherein the outer edge maintains a substantially constant height away from the hub surface throughout the at least 360 degree twist.

4. The disc of claim 1, wherein the longitudinal disc axis is coaxial with the center of the hub, and the disc further comprises:
   a disc rotation axis that is parallel to the central longitudinal axis and is offset from the center of the hub;
   wherein the disc is constructed to rotate about the disc rotation axis.

5. A disc screen comprising;
   a first and second adjacent discs, each disc comprising:
      a longitudinal disc axis;
      a hub extending a length along the longitudinal disc axis, the hub further comprising:
         a hub surface;
         a helical ridge extending away from the hub surface and forming an outer edge that:
            1. twists about the longitudinal axis at least 360 degrees; and
            2. maintains a substantially constant distance from the longitudinal disc axis throughout the at least 360 degree twist;

wherein a cross-section of the hub taken perpendicularly to the longitudinal disc axis is non-circular;

wherein the helical ridge structure from the first disc is interleaved with the helical ridge structure of the second disc.

6. The disc screen of claim 5, wherein the helical ridge of the first disc forms a gap with the hub surface of the second disc, and when the two discs are rotated in the same direction, the width of the gap is substantially constant.

7. The disc screen of claim 6, wherein the position of the gap moves along the direction of the longitudinal axis of the first disc.

8. The disc screen of claim 6, wherein the position of the gap relative to the center of the hub of the first disc is not substantially constant.

9. The disc screen of claim 5, wherein the outer edge maintains a substantially constant height away from the hub surface throughout the at least 360 degree twist.

10. The disc screen of claim 5, wherein the hub of both the first and second discs comprises multiple lobes.

11. The disc screen of claim 5, wherein the center of the hub for the first and second discs is coaxial with their respective longitudinal disc axes, and the first and second disc each comprises:
   a disc rotation axis that is parallel to the central longitudinal axis and is offset from the center of the hub;
   wherein the disc is constructed to rotate about the disc rotation axis.

12. The disc of claim 1, wherein the hub comprises three or more lobes.

13. The disc of claim 10, wherein the hub of both the first and second discs comprises three or more lobes.

14. A disc for use in a disc screen comprising:
   a longitudinal disc axis;
   a hub extending a length along the longitudinal disc axis, the hub further comprising:
      three or more lobes;
      a hub surface;
      a helical ridge structure extending away from the hub surface and twisting about the longitudinal axis at least 360 degrees; and
      wherein a cross-section of the hub taken perpendicularly to the longitudinal disc axis is non-circular.

15. A disc screen comprising;
   a first and second adjacent discs, each disc comprising:
      a longitudinal disc axis;
      a hub extending a length along the longitudinal disc axis, the hub further comprising:
         three or more lobes;
         a hub surface;
         a helical ridge structure extending away from the hub surface and twisting about the longitudinal axis at least 360 degrees; and
         wherein a cross-section of the hub taken perpendicularly to the longitudinal disc axis is non-circular;
   wherein the helical ridge structure from the first disc is interleaved with the helical ridge structure of the second disc.

* * * * *